United States Patent
Shirasaki et al.

(10) Patent No.: US 6,304,382 B1
(45) Date of Patent: *Oct. 16, 2001

(54) VIRTUALLY IMAGED PHASED ARRAY (VIPA) HAVING A VARYING REFLECTIVITY SURFACE TO IMPROVE BEAM PROFILE

(76) Inventors: Masataka Shirasaki, c/o Fujitsu Limited 1-2, Kamikodanaka 4-chome, Nakahara-ku, Kanagawa (JP); Simon Cao, 42501 Albrae St., Freemont, CA (US) 94538

( * ) Notice: Subject to any disclaimer, the term of this patent is extended or adjusted under 35 U.S.C. 154(b) by 0 days.

This patent is subject to a terminal disclaimer.

(21) Appl. No.: 09/431,206

(22) Filed: Nov. 1, 1999

Related U.S. Application Data

(60) Division of application No. 09/114,071, filed on Jul. 13, 1998, now Pat. No. 6,028,706, which is a continuation-in-part of application No. 08/796,842, filed on Feb. 7, 1997, now Pat. No. 5,930,045, which is a continuation-in-part of application No. 08/685,362, filed on Jul. 24, 1996, now Pat. No. 5,999,320.

Foreign Application Priority Data

Jul. 26, 1995 (JP) .................................................... 7-190535

(51) Int. Cl.[7] ............................ G02B 27/00; G02B 27/14
(52) U.S. Cl. ......................... 359/577; 359/629; 359/637; 359/839; 359/861
(58) Field of Search .................................. 359/577, 578, 359/579, 615, 618, 629, 634, 636, 637, 839, 856, 857, 861

(56) References Cited

U.S. PATENT DOCUMENTS 2,534,846    12/1950    Abrose et al. ..................... 359/577

(List continued on next page.)

FOREIGN PATENT DOCUMENTS

| 26669 | * | 5/1930 | (AU) | ..................... 359/578 |
| 0031027 | | 7/1981 | (EP) | ..................... 385/37 |
| 61-121011 | | 6/1986 | (JP) | ..................... 385/37 |
| 62-264009 | | 11/1987 | (JP) | ..................... 385/37 |
| 1-280706 | | 11/1989 | (JP) | ..................... 385/37 |

OTHER PUBLICATIONS

M. Shirasaki, Large Angular–Dispersion By Virtually–Imaged Phased–Array (VIPA) and Its Application to Wavelength Demultiplexing, MOC '95, Hiroshima, Oct. 1995.

(List continued on next page.)

*Primary Examiner*—Cassandra Spyrou
*Assistant Examiner*—John Juba, Jr.

(57) ABSTRACT

A virtually imaged phased array (VIPA) operating as a wavelength splitter to separate individual carriers from a wavelength division multiplexed (WDM) light. The VIPA has first and second surfaces. The second surface has a reflectivity which causes a portion of light incident thereon to be transmitted therethrough. The VIPA receives an input light at a respective wavelength within a continuous range of wavelengths. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light having any other wavelength within the continuous range of wavelengths. The reflectivity of the second surface varies along the second surface so that the output light has a desired beam profile, such as an approximately symmetric beam profile, along the second surface. A phase adjustment buffer layer can be provided to cause the lights reflected from the second surface to the first surface to have a uniform optical phase along the second surface. Further, a phase adjustment layer can be provided to cause the plurality of transmitted lights to have a uniform optical phase along the second surface.

59 Claims, 20 Drawing Sheets

U.S. PATENT DOCUMENTS

| | | | |
|---|---|---|---|
| 3,647,285 | 3/1972 | Harvey et al. | 359/577 |
| 3,832,030 | 8/1974 | Gloge | 385/33 |
| 4,257,673 | 3/1981 | Matthijsse | 385/37 |
| 4,362,361 | 12/1982 | Campbell et al. | 359/629 |
| 4,655,547 | 4/1987 | Heritage et al. | 359/563 |
| 4,820,019 | 4/1989 | Yoshida et al. | 359/578 |
| 5,040,872 | 8/1991 | Steinle | 349/638 |
| 5,071,225 | 12/1991 | Inoue | 359/589 |
| 5,119,454 | 6/1992 | McMahon | 385/49 |
| 5,166,818 | 11/1992 | Chase et al. | 359/615 |
| 5,202,939 * | 4/1993 | Belleville et al. | 385/12 |
| 5,309,456 | 5/1994 | Horton | 372/25 |
| 5,583,683 | 12/1996 | Scobey | 359/127 |
| 5,666,195 * | 9/1997 | Shultz et al. | 356/352 |
| 5,715,095 | 2/1998 | Hiratsuka et al. | 359/634 |
| 5,786,915 | 7/1998 | Scobey | 359/127 |
| 6,028,706 * | 7/1998 | Shirasaki et al. | 359/577 |

OTHER PUBLICATIONS

M. Shirasaki, Large Angular Dispersion by a Virtually–Imaged Phased Array and its Application to a Wavelength Demultimplexer, Optics Letters, vol. 21, No. 5, Mar. 1996.

M. Shirasaki, Temperature Independent Interferometer For WDM Filters, Paper WeD. 1.6 ECOC '96 (European Conference on Optical Communication), Sep. 18, 1996.

M. Shirasaki, Filtering Characteristics of Virtually–Imaged Phased Array , Presented at IPR (Integrated Photonics Research) Topical Meeting Paper IMC3, Apr. 29, 1996, Boston, MA.

* cited by examiner

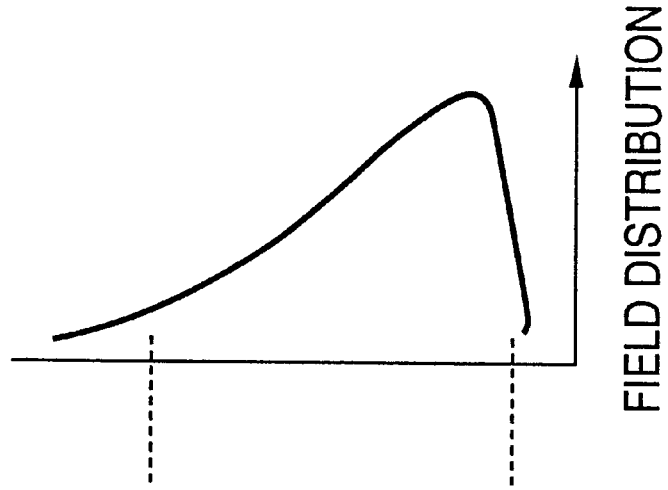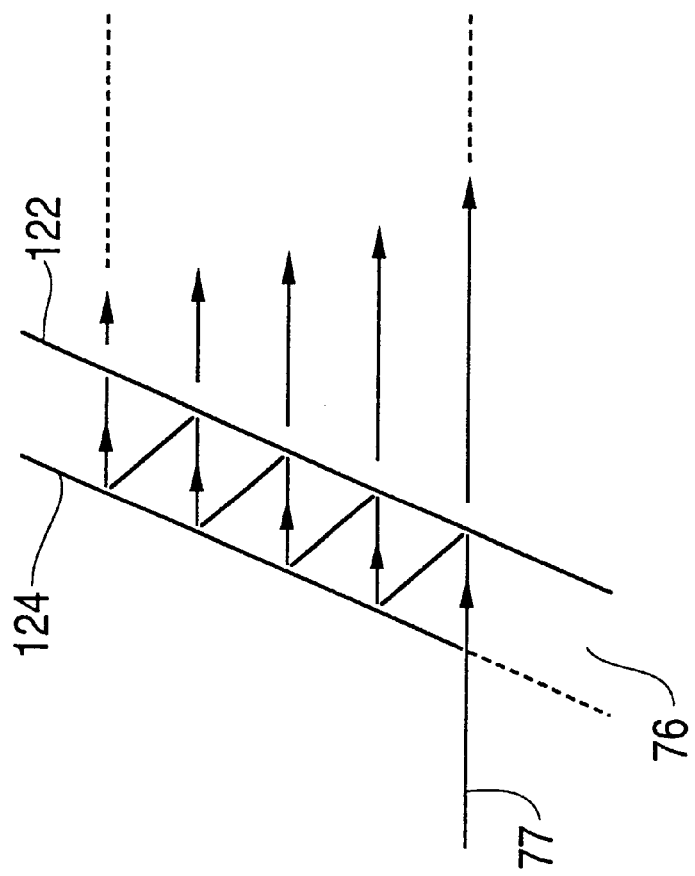

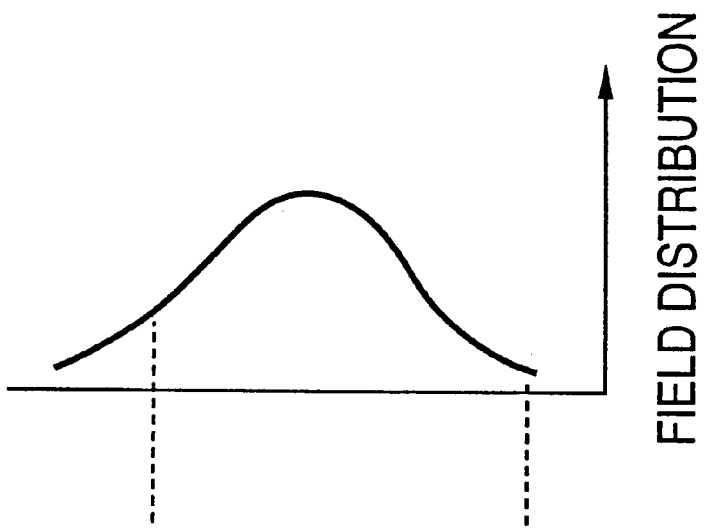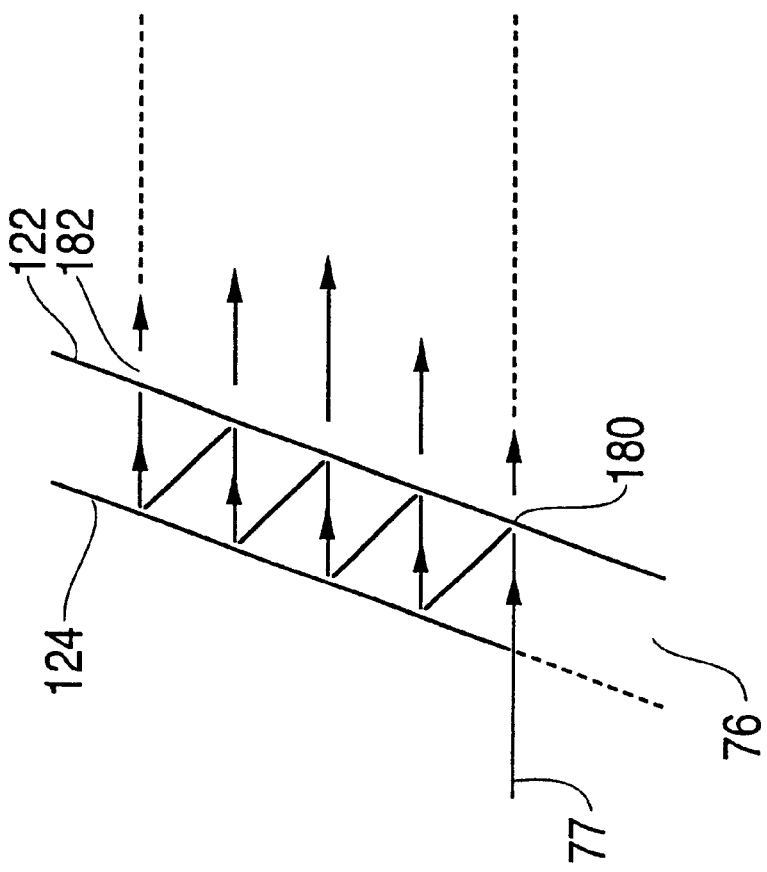

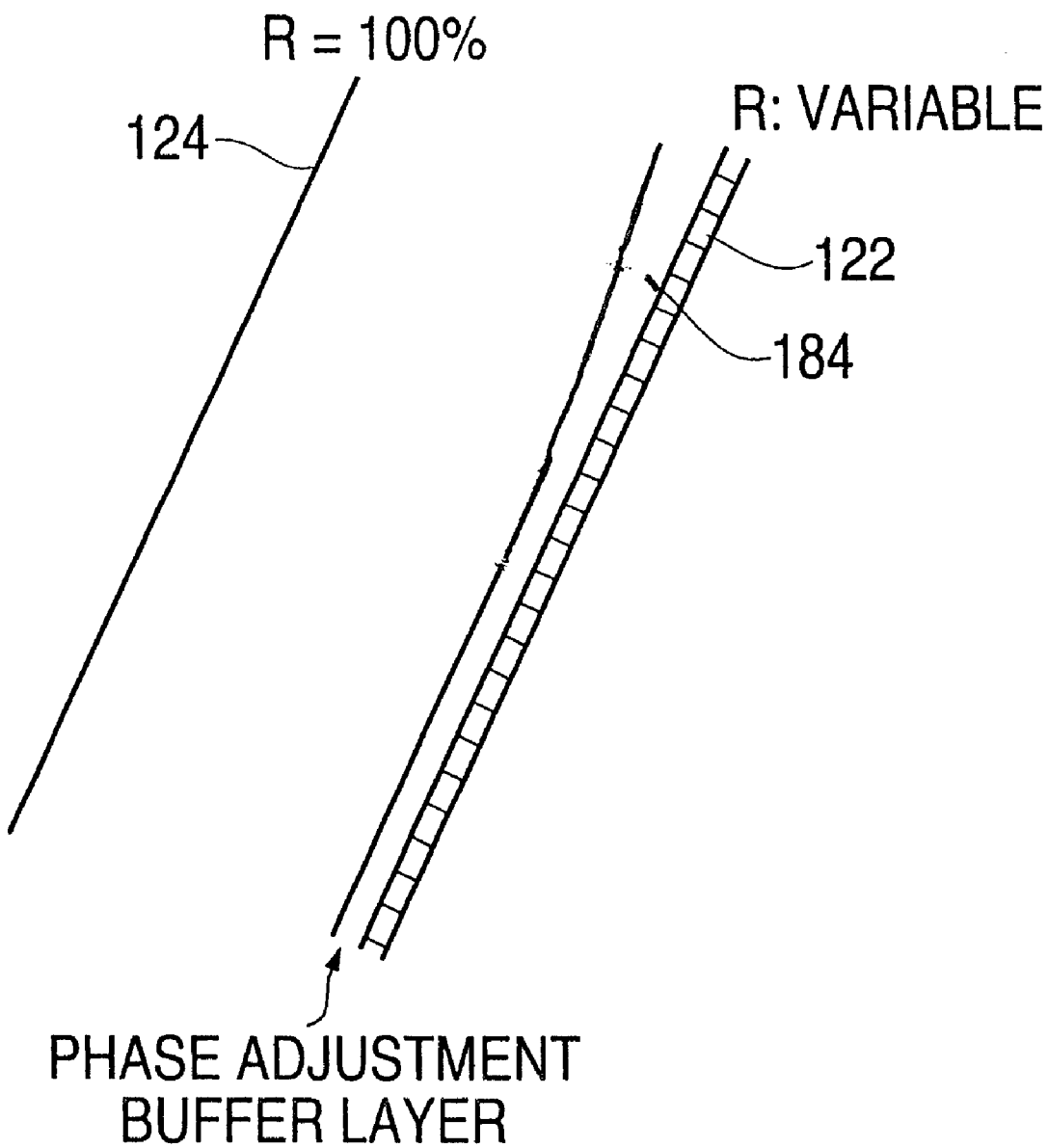

VIRTUALLY IMAGED PHASED ARRAY (VIPA) HAVING A VARYING REFLECTIVITY SURFACE TO IMPROVE BEAM PROFILE

CROSS-REFERENCE TO RELATED APPLICATIONS

This application is based on, and claims priority to, Japanese patent application number 07-190535, filed Jul. 26, 1995, in Japan, and which is incorporated herein by reference.

This application is a divisional of application Ser. No. 09/114,071, filed Jul. 13. 1998, now U.S. Pat. No. 6,028,706.

This application is also a continuation-in-part (CIP) of U.S. application 08/685,362, filed Jul. 24, 1996, titled "VIRTUALLY IMAGED PHASED ARRAY AS A WAVELENGTH DEMULTIPLEXER", now U.S. Pat. No. 5,999,320 and which is incorporated herein by reference.

This application is also a CIP of U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION", now U.S. Pat. No. 5,930,045 and which is incorporated herein by reference.

This application is related to U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION", now U.S. Pat. No. 5,969,865 and which is incorporated herein by reference.

This application is also related to U.S. application Ser. No. 08/948,945, filed Oct. 10, 1997, now U.S. Pat. No. 5,973,838 titled "APPARATUS WHICH INCLUDES A VIRTUALLY IMAGED PHASED ARRAY (VIPA) IN COMBINATION WITH A WAVELENGTH SPLITTER TO DEMULNPLEX A WAVELENGTH DIVISION MULTPLEXED (WDM) LIGHT", and which is incorporated herein by reference.

BACKGROUND OF THE INVENTION

1. Field of the Invention

The present invention relates to a virtually imaged phased array (VIPA), or "wavelength splitter", which receives a wavelength division multiplexed light comprising a plurality of carriers, and splits the wavelength division multiplexed light into a plurality of luminous fluxes which correspond, respectively, to the plurality of carriers and are spatially distinguishable from each other.

2. Description of the Related Art

Wavelength division multiplexing is used in fiber optic communication systems to transfer a relatively large amount of data at a high speed. More specifically, a plurality of carriers, each modulated with information, is combined into a wavelength division multiplexed light. The wavelength division multiplexed light is then transmitted through a single optical fiber to a receiver. The receiver splits the wavelength division multiplexed light into the individual carriers, so that the individual carriers can be detected. In this manner, a communication system can transfer a relatively large amount of data over an optical fiber.

Therefore, the ability of the receiver to accurately split the wavelength division multiplexed light will greatly effect the performance of the communication system. For example, even if a large number of carriers can be combined into a wavelength division multiplexed light, such a wavelength division multiplexed light should not be transmitted if the receiver cannot accurately split the wavelength division multiplexed light. Accordingly, it is desirable for a receiver to include a high-precision wavelength splitter.

FIG. 1 is a diagram illustrating a conventional filter using a multiple-layer interference film, for use as a wavelength splitter. Referring now to FIG. 1, a multiple-layer interference film 20 is formed on a transparent substrate 22. Light 24, which must be parallel light, is incident on film 20 and then repeatedly reflected in film 20. Optical conditions determined by the characteristics of film 20 allow only a light 26 having wavelength $\lambda 2$ to pass therethrough. A light 28, which includes all light not meeting the optical conditions, does not pass through the film 20 and is reflected. Thus, a filter as illustrated in FIG. 1 is useful for splitting a wavelength division multiplexed light which includes only two carriers at different wavelengths, $\lambda 1$ and $\lambda 2$. Unfortunately, such a filter, by itself, cannot separate a wavelength division multiplexed light having more than two carriers.

FIG. 2 is a diagram illustrating a conventional Fabry-Perot interferometer for use as a wavelength splitter. Referring now to FIG. 2, high-reflectance reflecting films 30 and 32 are parallel to each other. Light 34, which must be parallel light, is incident on reflecting film 30 and reflected many times between reflecting films 30 and 32. Light 36 of wavelength $\lambda 2$ that meets passage conditions determined by the characteristics of the Fabry-Perot interferometer passes through reflecting film 32. Light 38 of wavelength $\lambda 1$, which does not meet the passage conditions, is reflected. In this manner, light having two different wavelengths can be split into two different lights corresponding, respectively, to the two different wavelengths. Thus, as with the filter illustrated in FIG. 1, a conventional Fabry-Perot interferometer is useful for splitting a wavelength division multiplexed light which includes only two carriers at different wavelengths, $\lambda 1$ and $\lambda 2$. Unfortunately, such a Fabry-Perot interferometer cannot separate a wavelength division multiplexed light having more than two carriers.

FIG. 3 is a diagram illustrating a conventional Michelson interferometer for use as a wavelength splitter. Referring now to FIG. 3, parallel light 40 is incident on a half mirror 42 and split into a first light 44 and a second light 46 perpendicular to each other. A reflecting mirror 48 reflects first light 44 and a reflecting mirror 50 reflects second light 46. The distance between half mirror 42 and reflecting mirror 48, and the distance between half mirror 42 and reflecting mirror 50 indicate an optical path difference. Light reflected by reflecting mirror 48 is returned to half mirror 42 and interferes with light reflected by reflecting mirror 50 and returned to half mirror 42. As a result, lights 52 and 54 having wavelengths $\lambda 1$ and $\lambda 2$, respectively, are separated from each other. As with the filter illustrated in FIG. 1 and the Fabry-Perot interferometer illustrated in FIG. 2, the Michelson interferometer illustrated in FIG. 3 is useful for splitting a wavelength division multiplexed light which includes only two carriers at different wavelengths, $\lambda 1$ and $\lambda 2$. Unfortunately, such a Michelson interferometer cannot separate a wavelength division multiplexed light having more than two carriers.

It is possible to combine several filters, Fabry-Perot interferometers or Michelson interferometers into a giant array so that additional wavelength carriers can be split from a single wavelength division multiplexed light. However, such an array is expensive, inefficient and creates an undesirably large receiver.

A diffraction grating or an array waveguide grating is often used to split a wavelength division multiplexed light comprising two or more different wavelength carriers.

FIG. 4 is a diagram illustrating a conventional diffraction grating for splitting a wavelength division multiplexed light. Referring now to FIG. 4, a diffraction grating 56 has a concavo-convex surface 58. Parallel light 60 having a plurality of different wavelength carriers is incident on concavo-convex surface 58. Each wavelength carrier is reflected and interferes among the reflected lights from different steps of the grating. As a result, carriers 62, 64 and 66 having different wavelengths are output from diffraction grating 56 at different angles, and are therefore separated from each other.

Unfortunately, a diffraction grating outputs the different wavelength carriers with relatively small difference of angle. Therefore, the angular dispersion produced by the diffraction grating will be extremely small. As a result, it is difficult for a receiver to accurately receive the various carrier signals split by the diffraction grating. This problem is especially severe with a diffraction grating which splits a wavelength division multiplexed light having a large number of carriers with relatively close wavelengths.

In addition, a diffraction grating is influenced by the optical polarization of the incident light. Therefore, the polarization of the incident light can affect the performance of the diffraction grating. Also, the concavo-convex surface of a diffraction grating requires complex manufacturing processes to produce an accurate diffraction grating.

FIG. 5 is a diagram illustrating a conventional array waveguide grating for splitting a wavelength division multiplexed light. Referring now to FIG. 5, light comprising a plurality of different wavelength carriers is received through an entrance 68 and is divided through a number of waveguides 70. An optical exit 72 is at the end of each waveguide 70, so that an output light 74 is produced. Waveguides 70 are different in length from each other, and therefore provide optical paths of different lengths. Therefore, lights passing through waveguides 70 have different path lengths from each other and thereby interfere with each other through exit 72 to form output 74 in different directions for different wavelengths.

In an array waveguide grating, the angular dispersion can be adjusted to some extent by properly configuring the waveguides. However, an array waveguide grating is influenced by temperature changes and other environmental factors. Therefore, temperature changes and environmental factors make it difficult to properly adjust the performance.

SUMMARY OF THE INVENTION

Accordingly, it is an object of the present invention to provide a wavelength splitter having a simple configuration and being capable of simultaneously separating a plurality of carriers from a wavelength division multiplexed light.

It is an additional object of the present invention to provide a wavelength splitter which disperses separated carriers at a relatively large angular dispersion, is resistant to changes in environmental conditions, and produces a resulting luminous flux having desirable beam profiles, one of which is a symmetrical beam profile for efficient coupling to an optical fiber.

Objects of the present invention are achieved by providing an apparatus having first and second surfaces. The second surface has a reflectivity which causes a portion of light incident thereon to be transmitted therethrough. The apparatus receives an input light at a respective wavelength within a continuous range of wavelengths. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light having any other wavelength within the continuous range of wavelengths. The reflectivity of the second surface varies along the second surface so that the output light has a desirable beam profile along the second surface. A phase adjustment buffer layer can be provided to cause lights reflected from the second surface to the first surface to have a uniform optical phase along the second surface. Further, a phase adjustment layer can be provided to cause the plurality of transmitted lights to have a uniform optical phase along the second surface.

Objects of the present invention are also achieved by providing an apparatus which includes first and second surfaces, where the second surface has a reflectivity which causes a portion of light incident thereon to be transmitted therethrough. The apparatus receives an input light at a respective wavelength and which is focused into a line. The first and second surfaces are positioned so that the input light radiates from the line to be reflected a plurality of times between the first and second surfaces and thereby cause a plurality of lights to be transmitted through the second surface. The plurality of transmitted lights interfere with each other to produce an output light which is spatially distinguishable from an output light produced for an input light at a different wavelength. The reflectivity of the second surface varies along the second surface so that the output light has a desirable beam profile along the second surface.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 14(A) is a diagram illustrating the operation of a VIPA, according to an embodiment of the present invention, and FIG. 14(B) is a diagram illustrating the beam profile of the VIPA.

FIG. 15(A) is a diagram illustrating the operation of a VIPA, according to an embodiment of the present invention, and FIG. 15(B) is a diagram illustrating the beam profile of the VIPA in FIG. 15(A), according to an embodiment of the present invention.

FIG. 17 is a diagram illustrating a VIPA having a phase adjustment buffer layer which maintains the optical phase of reflected lights to be substantially uniform, according to an embodiment of the present invention.

DESCRIPTION OF THE PREFERRED EMBODIMENTS

Figure 1:
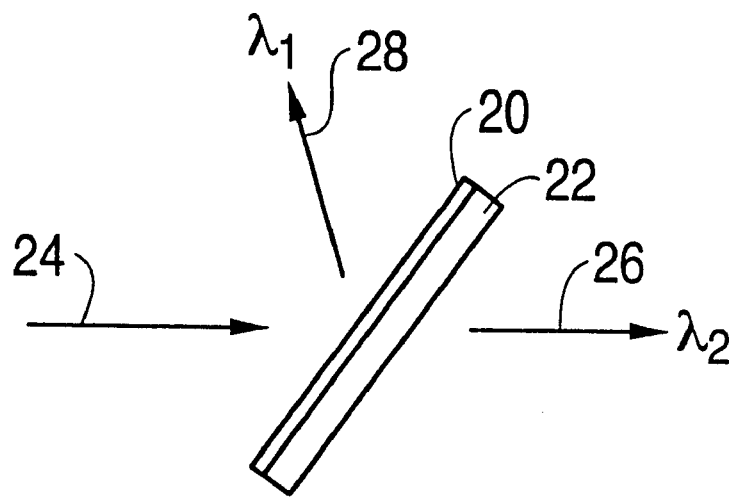
FIG. 1 (prior art) is a diagram illustrating a conventional filter using a multiple-layer interference film.
Figure 2:
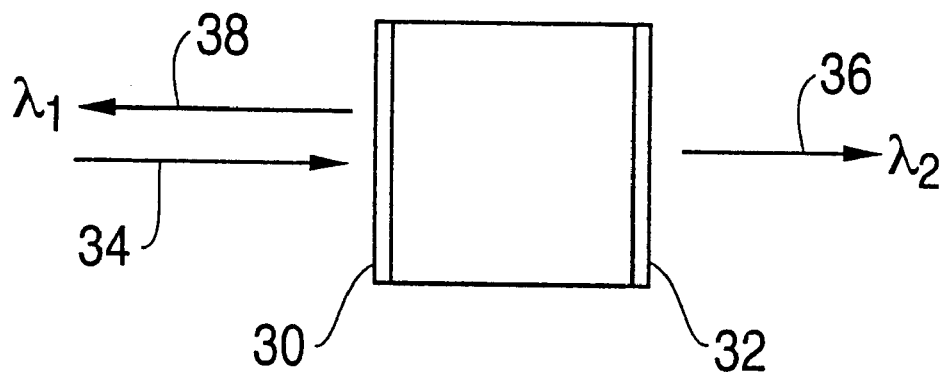
FIG. 2 (prior art) is a diagram illustrating a conventional Fabry-Perot interferometer.
Figure 3:
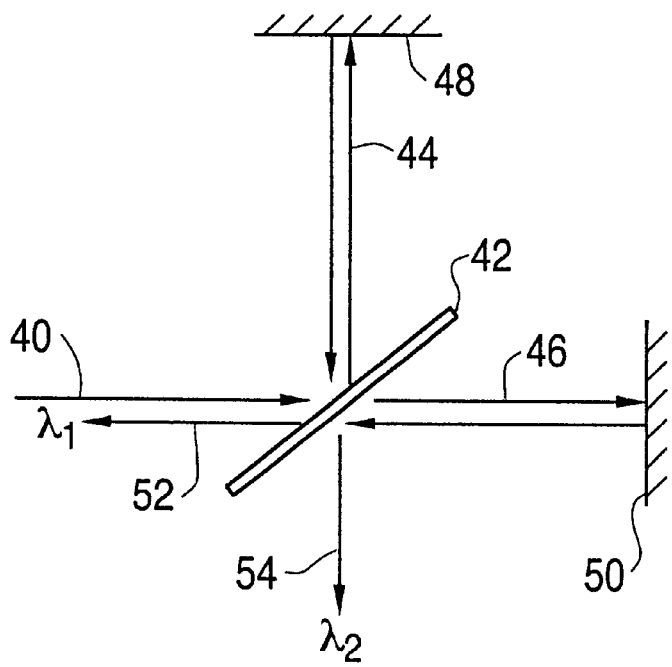
FIG. 3 (prior art) is a diagram illustrating a conventional Michelson interferometer.
Figure 4:
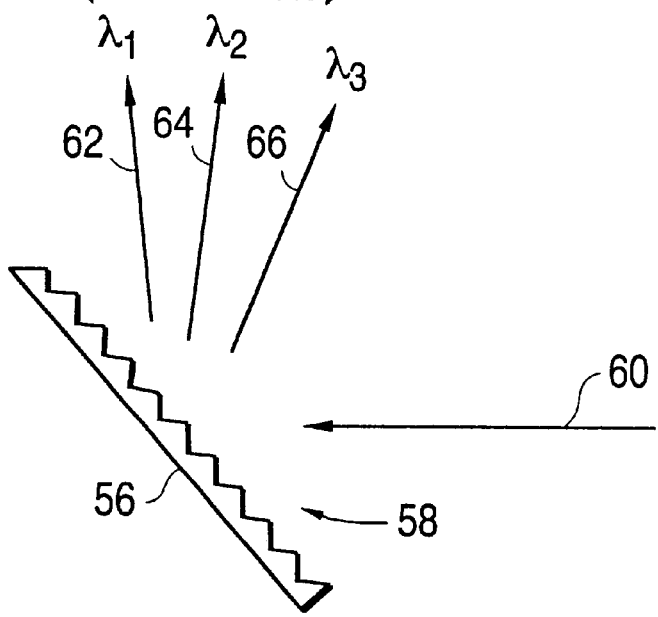
FIG. 4 (prior art) is a diagram illustrating a conventional diffraction grating.
Figure 5:
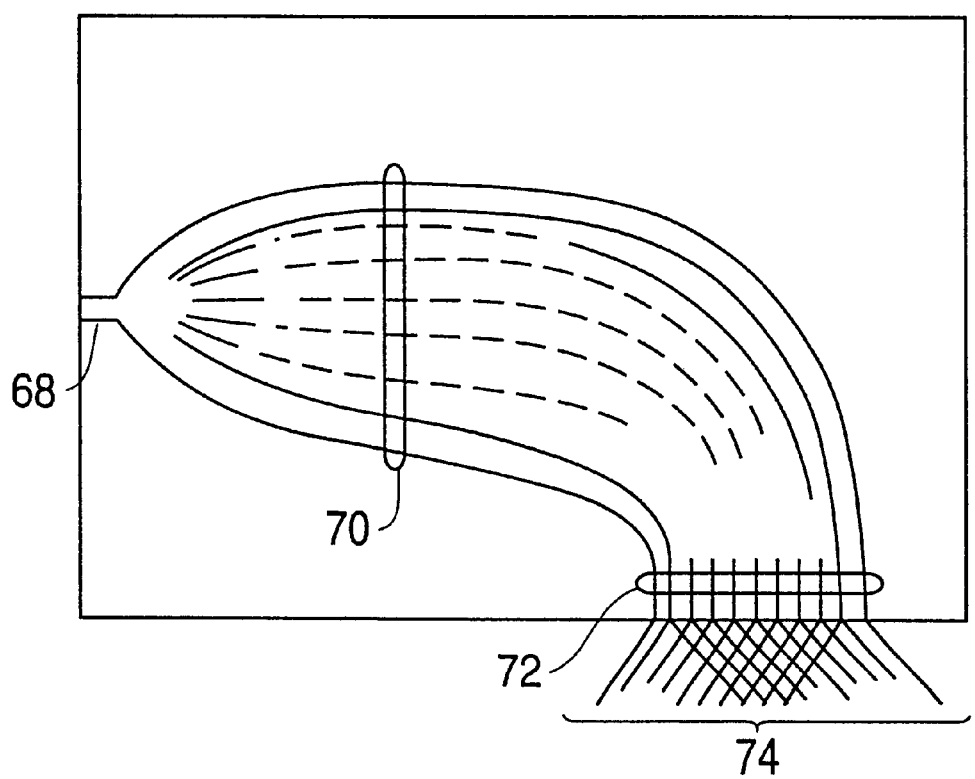
FIG. 5 (prior art) is a diagram illustrating a conventional array waveguide grating for splitting a wavelength division multiplexed light.

Reference will now be made in detail to the present preferred embodiments of the present invention, examples of which are illustrated in the accompanying drawings, wherein like reference numerals refer to like elements throughout.

Figure 6:
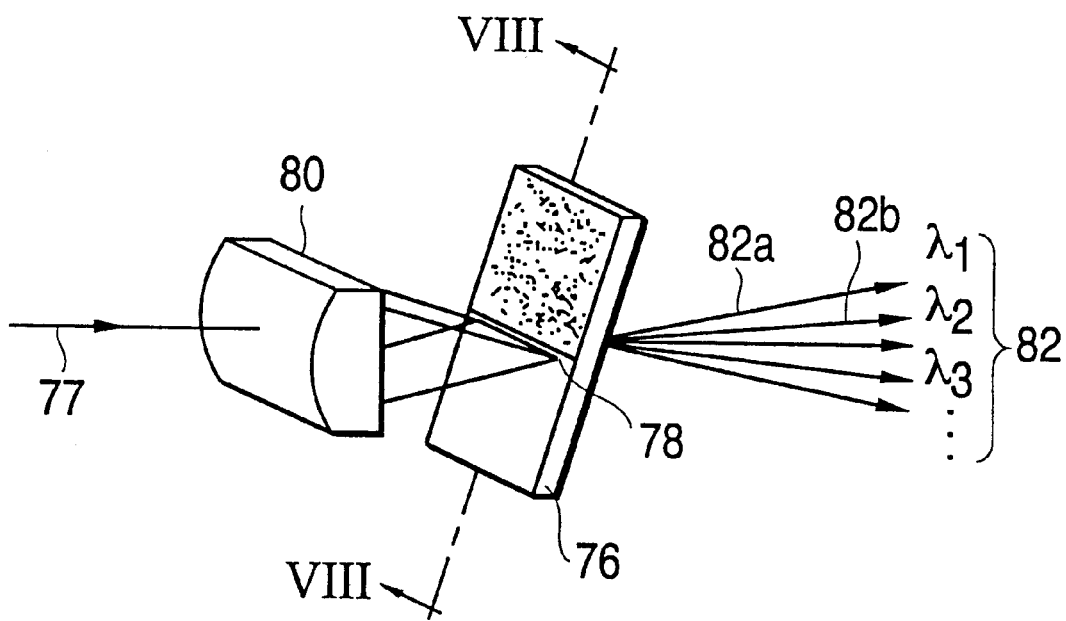
FIG. 6 is a diagram illustrating a virtually imaged phased array (VIPA), according to an embodiment of the present invention.

FIG. 6 is a diagram illustrating a virtually imaged phased array (VIPA), according to an embodiment of the present invention. Moreover, hereinafter, the terms "wavelength splitter", "virtually imaged phased array" and "VIPA" can be used interchangeably to describe various embodiments of the present invention.

Referring now to FIG. 6, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 inside VIPA 76. VIPA 76 then outputs a luminous flux 82 of collimated light, where the output angle of luminous flux 82 varies as the wavelength of input light 77 changes. For example, when input light 77 is at a wavelength λ1, VIPA 76 outputs a luminous flux 82a at wavelength λ1 in a specific direction. When input light 77 is at a wavelength λ2, VIPA 76 outputs a luminous flux 82b at wavelength λ2 in a different direction. Therefore, VIPA 76 produces luminous fluxes 82a and 82b which are spatially distinguishable from each other. If input light 77 includes both wavelengths λ1 and λ2, then VIPA 76 will simultaneously output both luminous fluxes 82a and 82b.

Figure 7:
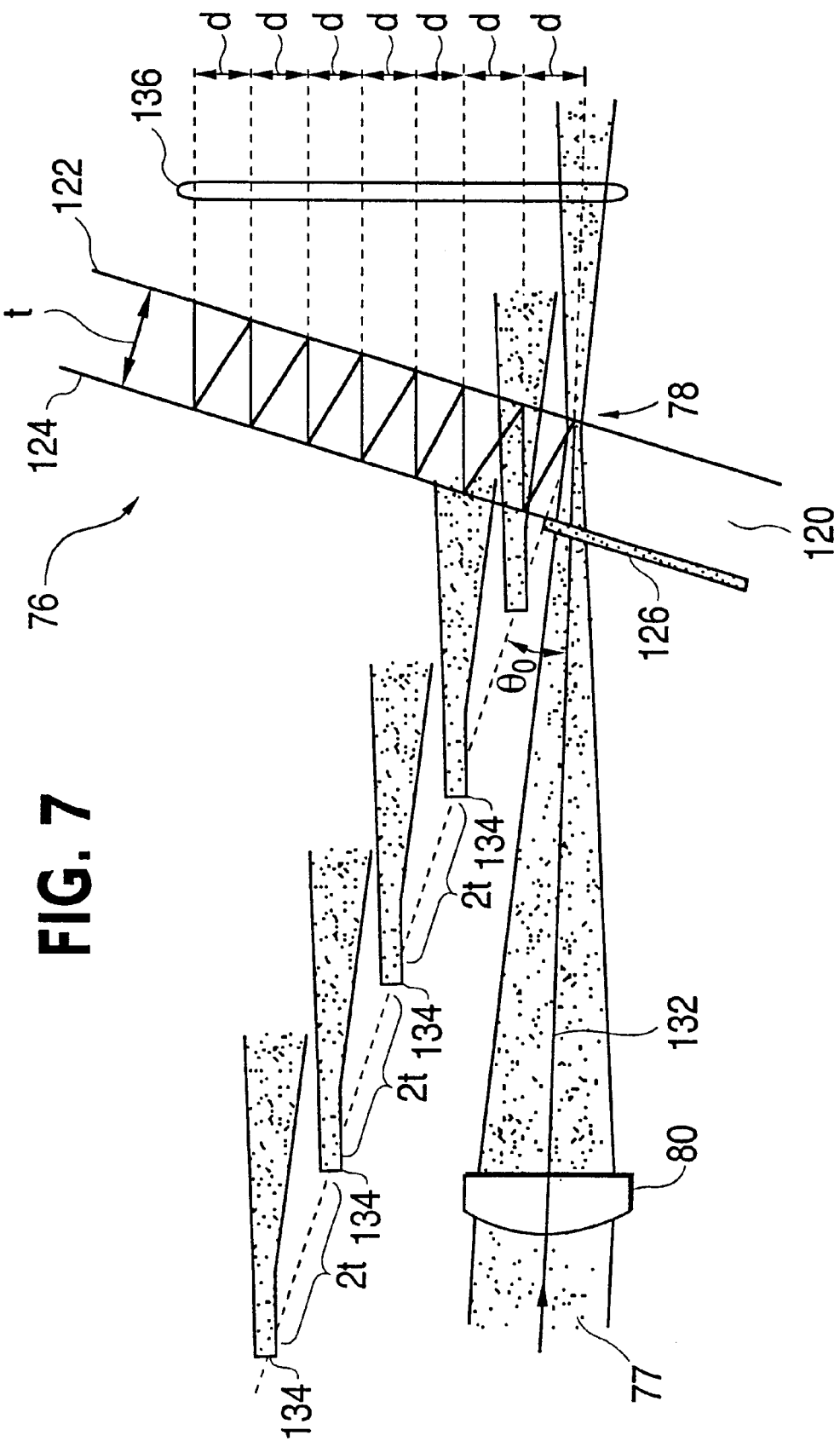
FIG. 7 is a detailed diagram illustrating the VIPA of FIG. 6, according to an embodiment of the present invention.

FIG. 7 is a detailed diagram illustrating VIPA 76, according to an embodiment of the present invention. Referring now to FIG. 7, VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0%.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated in FIG. 7 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of input light 77 as it travels through radiation window 126 (for example, the area "a" illustrated in FIG. 10, discussed in more detail further below), and (ii) the area of light on reflecting film 124 when input light 77 is reflected for the first time by reflecting film 124 (for example, the area "b" illustrated in FIG. 10, discussed in more detail further below). It is desirable to reduce such overlap to ensure proper operation of the VIPA.

In FIG. 7, an optical axis 132 of input light 77 has a small tilt angle $\theta_0$. Assuming the reflectivity of reflecting film 122 is 95%, upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 7, the light is split into many paths with a constant separation d. The beam shape in each path forms so that the light diverges from virtual images 134 of the beam waist. Virtual images 134 are located with constant spacing 2t along a line that is normal to plate 120, where t is the thickness of plate 120. The positions of the beam waists in virtual images 134 are self-aligned, and there is no need to adjust individual positions. The lights diverging from virtual images 134 interfere with each other and form collimated light 136 which propagates in a direction that changes in accordance with the wavelength of input light 77.

The spacing of light paths is $d = 2t \sin \theta_0$, and the difference in the path lengths between adjacent beams is $2t \cos \theta_0$. The angular dispersion is proportional to the ratio of these two numbers, which is $\cot \theta_0$. As a result, a VIPA produces a significantly large angular dispersion.

As easily seen from FIG. 7, the term "virtually imaged phased array" arises from the formation of an array of virtual images 134.

Figure 8:
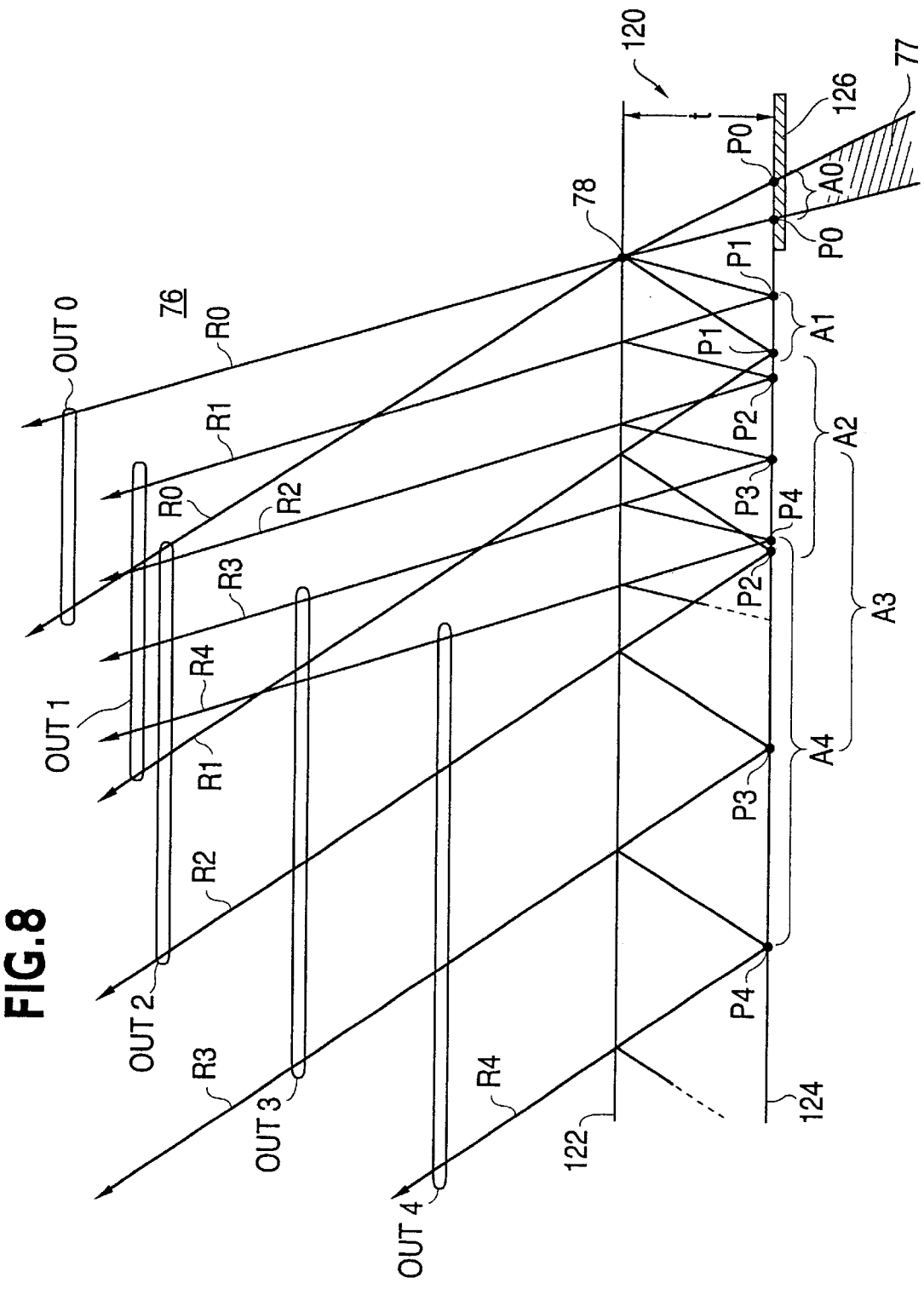
FIG. 8 is a diagram illustrating a cross-section along lines VIII—VIII of the VIPA illustrated in FIG. 6, according to embodiment of the present invention.

FIG. 8 is a diagram illustrating a cross-section along lines VIII—VIII of VIPA 76 illustrated in FIG. 6, according to embodiment of the present invention. Referring now to FIG.

8, plate 120 has reflecting surfaces 122 and 124 thereon. Reflecting surfaces 122 and 124 are in parallel with each other and spaced by the thickness t of plate 120. Reflecting surfaces 122 and 124 are typically reflecting films deposited on plate 120. As previously described, reflecting surface 124 has a reflectance of approximately 100%, except in radiation window 126, and reflecting surface 122 has a reflectance of approximately 95% or higher. Therefore, reflecting surface 122 has a transmittance of approximately 5% or less so that approximately 5% or less of light incident on reflecting surface 122 will be transmitted therethrough and approximately 95% or more of the light will be reflected. The reflectances of reflecting surfaces 122 and 124 can easily be changed in accordance with the specific VIPA application. However, generally, reflecting surface 122 should have a reflectance which is less than 100% so that a portion of incident light can be transmitted therethrough.

Reflecting surface 124 has radiation window 126 thereon. Radiation window 126 allows light to pass therethrough, and preferably has no reflectance, or a very low reflectance. Radiation window 126 receives input light 77 to allow input light 77 to be received between, and reflected between, reflecting surfaces 122 and 124.

Since FIG. 8 represents a cross-section along lines VIII—VIII in FIG. 6, focal line 78 in FIG. 6 appears as a "point" in FIG. 8. Input light 77 then propagates radially from focal line 78. Moreover, as illustrated in FIG. 8, focal line 78 is positioned on reflecting surface 122. Although it is not required for focal line 78 to be on reflecting surface 122, a shift in the positioning of focal line 78 may cause small changes in the characteristics of VIPA 76.

As illustrated in FIG. 8, input light 77 enters plate 120 through an area A0 in radiation window 126, where points P0 indicate peripheral points of area A0.

Due to the reflectivity of reflecting surface 122, approximately 95% or more of input light 77 is reflected by reflecting surface 122 and is incident on area A1 of reflecting surface 124. Points P1 indicate peripheral points of area A1. After reflecting off area A1 on reflecting surface 124, input light 77 travels to reflecting surface 122 and is partially transmitted through reflecting surface 122 as output light Out1 defmed by rays R1. In this manner, as illustrated in FIG. 8, input light 77 experiences multiple reflections between reflecting surfaces 122 and 124, wherein each reflection off of reflecting surface 122 also results in a respective output light being transmitted therethrough. Therefore, for example, input light 77 reflects off of areas A2, A3 and A4 to produce output lights Out2, Out3 and Out4. Points P2 indicate peripheral points of area A2, points P3 indicate peripheral points of area A3, and points P4 indicate peripheral points of area A4. Output light Out2 is defined by rays R2, output light Out3 is defined by rays R3 and output light Out4 is defined by rays R4. Although FIG. 8 only illustrates output lights Out0, Out1, Out2, Out3 and Out4, there will actually be many more output lights, depending on the power on input light 77 and the reflectances of reflecting surfaces 122 and 124. As will be discussed in more detail further below, the output lights interfere with each other to produce a luminous flux having a direction which changes in accordance with the wavelength of input light 77.

Figure 9:
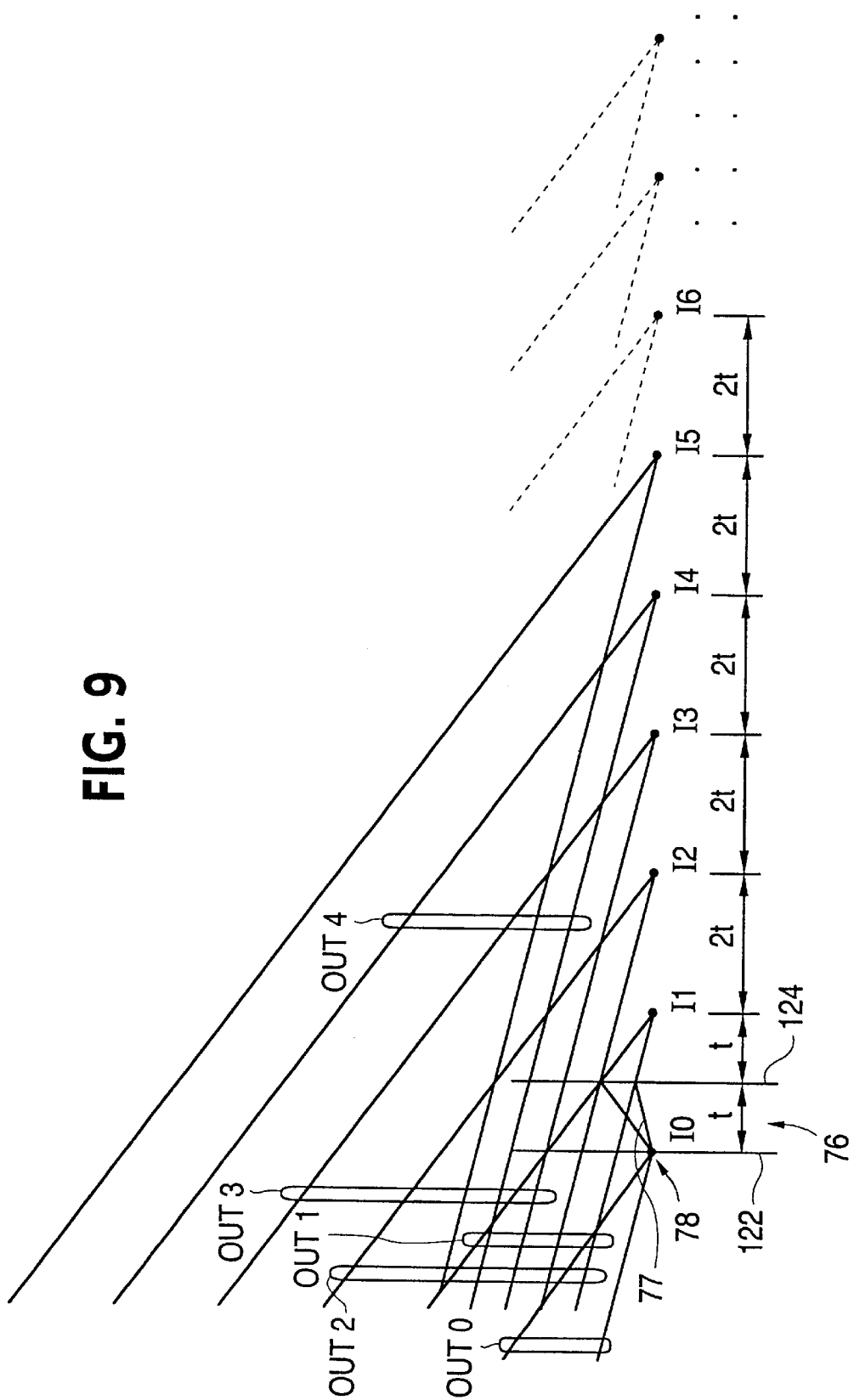
FIG. 9 is a diagram illustrating interference produced by a VIPA, according to an embodiment of the present invention.

FIG. 9 is a diagram illustrating interference produced by a VIPA, according to an embodiment of the present invention. Referring now to FIG. 9, light travelling from focal line 78 is reflected by reflecting surface 124. As previously described, reflecting surface 124 has a reflectance of approximately 100% and, therefore, functions essentially as a mirror. As a result, output light Out1 can be optically analyzed as if reflecting surfaces 122 and 124 did not exist and, instead, output light Out1 was emitted from a focal line $I_1$. Similarly, output lights Out2, Out3 and Out4 can be optically analyzed as if they were emitted from focal lines $I_2$, $I_3$ and $I_4$, respectively. The focal lines $I_1$, $I_2$, $I_3$ and $I_4$ are virtual images of a focal line $I_0$.

Therefore, as illustrated in FIG. 9, focal line $I_1$ is a distance 2t from focal line $I_0$, where t equals the distance between reflecting surfaces 122 and 124. Similarly, each subsequent focal line is a distance 2t from the immediately preceding focal line. Thus, focal line $I_2$ is a distance 2t from focal line $I_1$. Moreover, each subsequent multiple reflection between reflecting surfaces 122 and 124 produces an output light which is weaker in intensity than the previous output light. Therefore, output light Out2 is weaker in intensity than output light Out1.

As illustrated in FIG. 9, output lights from the focal lines overlap and interfere with each other. This interference produces a luminous flux which travels in a specific direction depending on the wavelength of input light 77.

A VIPA according to the above embodiments of the present invention has strengthening conditions which are characteristics of the design of the VIPA. The strengthening conditions increase the interference of the output lights so that a luminous flux is formed. The strengthening conditions of the VIPA are represented by the following Equation (1):

$$2t \times \cos\theta = m\lambda$$

where $\theta$ indicates the propagation direction of the resulting luminous flux as measured from a line perpendicular to the surface of reflecting surfaces 122 and 124, $\lambda$ indicates the wavelength of the input light, t indicates the distance between the reflecting surfaces 122 and 124, and m indicates an integer.

Therefore, if t is constant and m is assigned a specific value, then the propagation direction $\theta$ of the luminous flux formed for input light having wavelength $\lambda$ can be determined.

More specifically, input light 77 is radially dispersed from focal line 78 through a specific angle. Therefore, input light having the same wavelength will be travelling in many different direction from focal line 78, to be reflected between reflecting surfaces 122 and 124. The strengthening conditions of the VIPA cause light travelling in a specific direction to be strengthened through interference of the output lights to form a luminous flux having a direction corresponding to the wavelength of the input light. Light travelling in different direction than the specific direction required by the strengthening condition will be weakened by the interference of the output lights.

Figure 10:
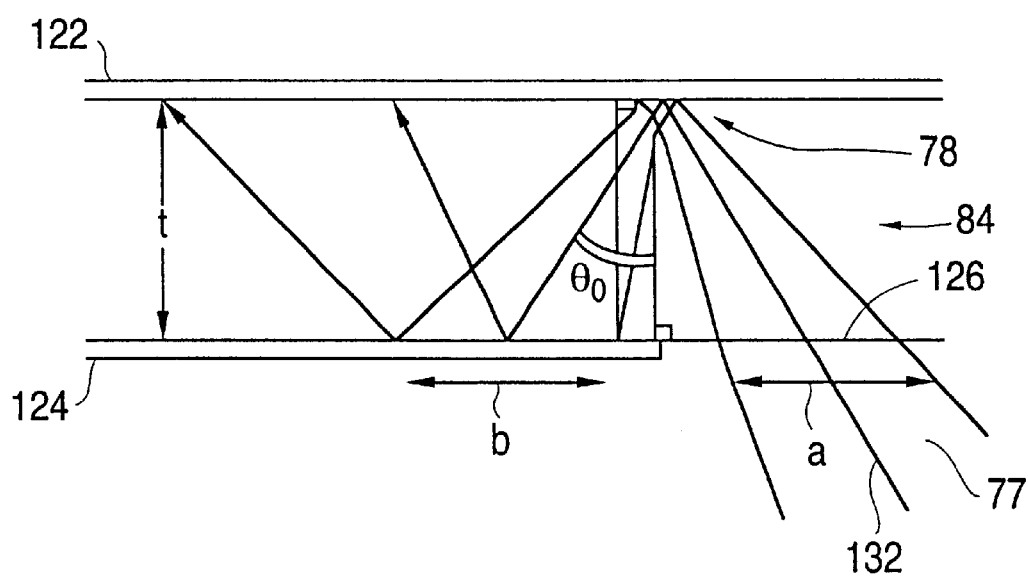
FIG. 10 is a diagram illustrating a cross-section along lines VIII—VIII of the VIPA illustrated in FIG. 6, for determining the tilt angle of input light, according to an embodiment of the present invention.

FIG. 10 is a diagram illustrating a cross-section along lines VIII—VIII of the VIPA illustrated in FIG. 6, showing characteristics of a VIPA for determining the angle of incidence, or tilt angle, of input light, according to an embodiment of the present invention.

Referring now to FIG. 10, input light 77 is collected by a cylindrical lens (not illustrated) and focused at focal line 78. As illustrated in FIG. 10, input light 77 covers an area having a width equal to "a" on radiation window 126. After input light 77 is reflected one time from reflecting surface 122, input light 77 is incident on reflecting surface 124 and covers an area having a width equal to "b" on reflecting surface 124. Moreover, as illustrated in FIG. 10, input light 77 travels along optical axis 132 which is at a tilt angle $\theta_0$ with respect to the normal to reflecting surface 122.

The tilt angle $\theta_0$ should be set to prevent input light 77 from travelling out of radiation window 126 after being reflected the first time by reflecting surface 122. In other words, the tilt angle $\theta_0$ should be set so that input light 77 remains "trapped" between reflecting surfaces 122 and 124 and does not escape through radiation window 126. Therefore, to prevent input light 77 from travelling out of radiation window 126, the tilt angle $\theta_0$ should be set in accordance with the following Equation (2):

tilt of optical axis $\theta_0 \geq (a+b)/4t$

The term (a+b) becomes minimum when a=b, which is the situation that focal line 78 is located on reflecting surface 122.

Therefore, as illustrated by FIGS. 6–10, embodiments of the present invention include a VIPA which receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 8 illustrates an input light 77 which experiences multiple reflection between reflecting surfaces 122 and 124. This multiple reflection produces a plurality of output lights Out0, Out1, Out2; Out3 and Out4 which interfere with each other to produce a spatially distinguishable luminous flux for each wavelength of input light 77.

"Self-interference" is a term indicating that interference occurs between a plurality of lights or beams which all originate from the same source. Therefore, the interference of output lights Out0, Out1, Out2, Out3 and Out4 is referred to as self-interference of input light 77, since output lights Out0, Out1, Out2, Out3 and Out4 all originate from the same source (that is, input light 77).

According to the above embodiments of the present invention, an input light can be at any wavelength within a continuous range of wavelengths. Thus, the input light is not limited to being a wavelength which is a value chosen from a range of discrete values.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 6, the travelling direction (that is, a "spatial characteristic") of the luminous flux 82 is different when input light 77 is at different wavelengths within a continuous range of wavelengths. Moreover, referring to FIG. 6, for example, if input light 77 included all three wavelengths $\lambda 1$, $\lambda 2$ and $\lambda 3$, then luminous fluxes 82a, 82b and 82c would be simultaneously produced, each travelling in a different direction.

According to the above embodiments of the present invention, a focal line is described as being on the opposite surface of a parallel plate from which input light enters. However, the focal line can be, for example, in the parallel plate, on the surface of the radiation window, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

According to the above embodiments of the present invention, a waveguide device is described as being formed by a parallel plate, or by two reflecting surfaces in parallel with each other. However, the plate or reflecting surfaces do not necessarily have to be parallel.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

The above embodiments of the present invention are described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are other ways in which luminous fluxes can be spatially distinguished from each other.

Figure 11:
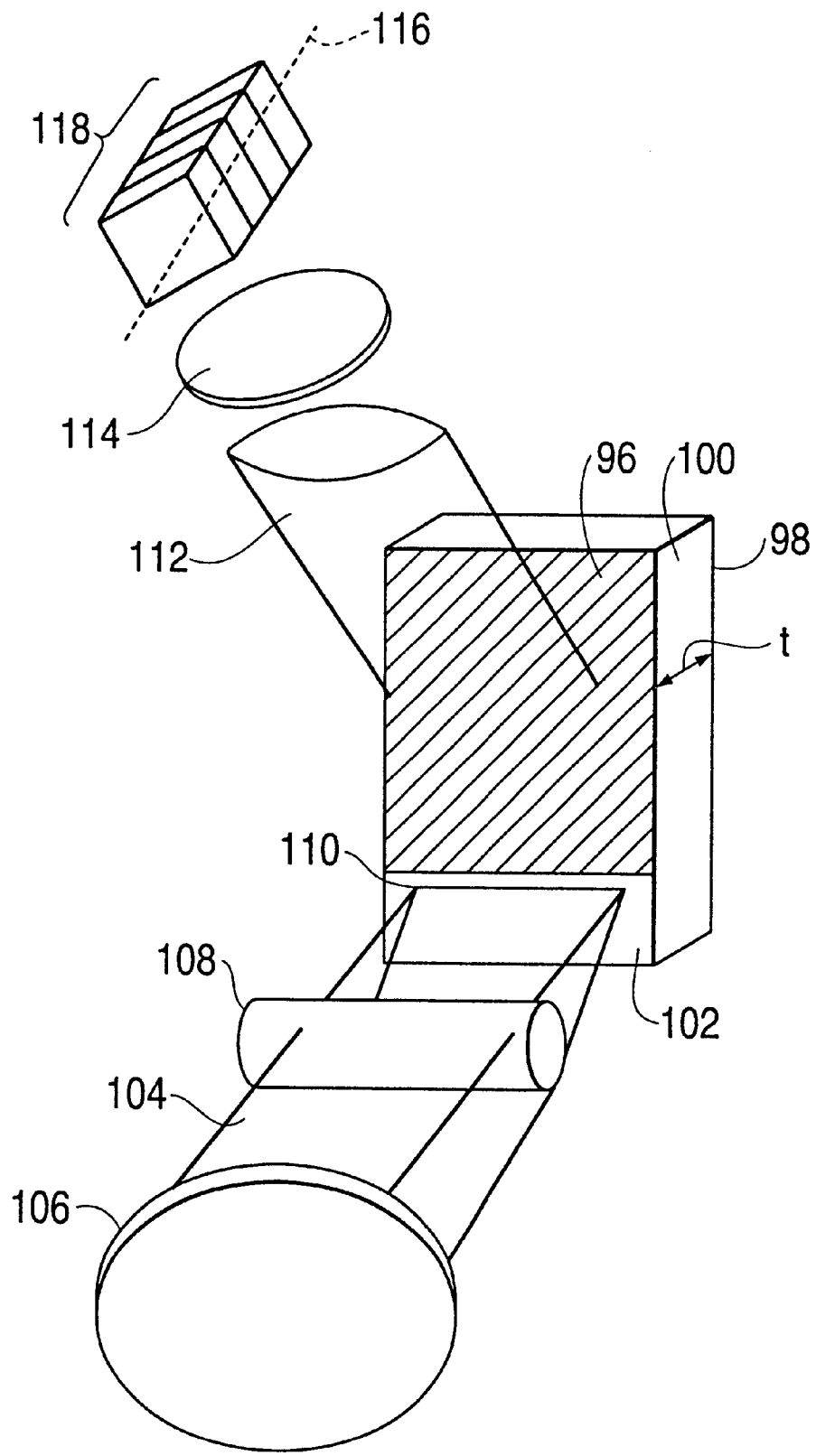
FIG. 11 is a diagram illustrating a VIPA as used with a receiver, according to an embodiment of the present invention.

FIG. 11 is a diagram illustrating a VIPA as used with a receiver, according to an embodiment of the present invention. Referring now to FIG. 11, multiple-layer reflecting films 96 and 98 are applied on both sides of a parallel plate 100 made of glass having a thickness, t, of, for example, 100 $\mu$m. It is preferable for parallel plate 100 to have a thickness in the range of 20 to 2000 $\mu$m. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different value as long as enough light is reflected from reflecting film 96 to allow for multiple reflections between reflecting films 96 and 98. Preferably, the reflectance of reflecting film 96 is in the range of 80% to a few percentages less than 100%. Moreover, the reflectance of reflecting film 98 is not limited to 100%, but should be high enough to allow multiple reflections between reflecting films 96 and 98.

A radiation window 102 receives input light and is positioned on parallel plate 100 on the same surface as reflecting film 96. Radiation window 102 can be formed by a film having approximately 0% reflectance on the surface of parallel plate 100. As illustrated in FIG. 11, the boundary between radiation window 102 and reflecting film 96 is preferably a straight line.

The input light is output from, for example, an optical fiber (not illustrated) and received by a collimating lens 106. Collimating lens 106 converts the input light into parallel beams 104 which are received by a cylindrical lens 108. Cylindrical lens 108 focuses parallel beams 104 into a focal line 110 on radiation window 102. Focal line 110 is positioned close to and parallel with the straight line boundary between reflecting film 96 and radiation window 102. In this manner, input light enters parallel plate 100 via radiation window 102.

The optical axis of input light 102 is at a tilt angle with respect to the normal to reflecting film 96 so that input light will not escape through radiation window 102 after entering parallel plate 100. Thus, the tilt angle is set in accordance with Equation (2), above.

Once inside parallel plate 100, the input light experiences multiple reflection between reflecting films 96 and 98 (as illustrated, for example, in FIG. 8). Each time the input light is incident on reflecting film 96, approximately 95% of the light is reflected towards reflecting film 98 and approximately 5% of the light passes through reflecting film 96 to form an output light (such as, for example, output light Out1 illustrated in FIG. 8). Multiple reflections between reflecting films 96 and 98 cause a plurality of output lights to be formed. The plurality of output lights interfere with each other to form a luminous flux 112 having a propagation direction which depends on the wavelength of the input light.

Luminous flux 112 is then collected by a lens 114, which focuses luminous flux 112 at a collection point. The collection point moves along a straight line path 116 for different wavelengths of the input light. For example, as the wavelength of the input light increases, the collection point is moved farther along straight line path 116. A plurality of receivers 118 are arranged on straight line path 116 to receive the focused luminous flux 112. Therefore, each receiver 118 can be positioned to receive a luminous flux corresponding to a specific wavelength.

By controlling the distance t between the reflecting films or reflecting surfaces of the VIPA, the phase difference of light reflected between the reflecting films or reflecting surfaces and can be shifted by a predetermined amount, thereby realizing excellent environmental resistance. Moreover, the above embodiments of the present invention experience only a small change in optical characteristics depending on the optical polarization.

Figure 12:
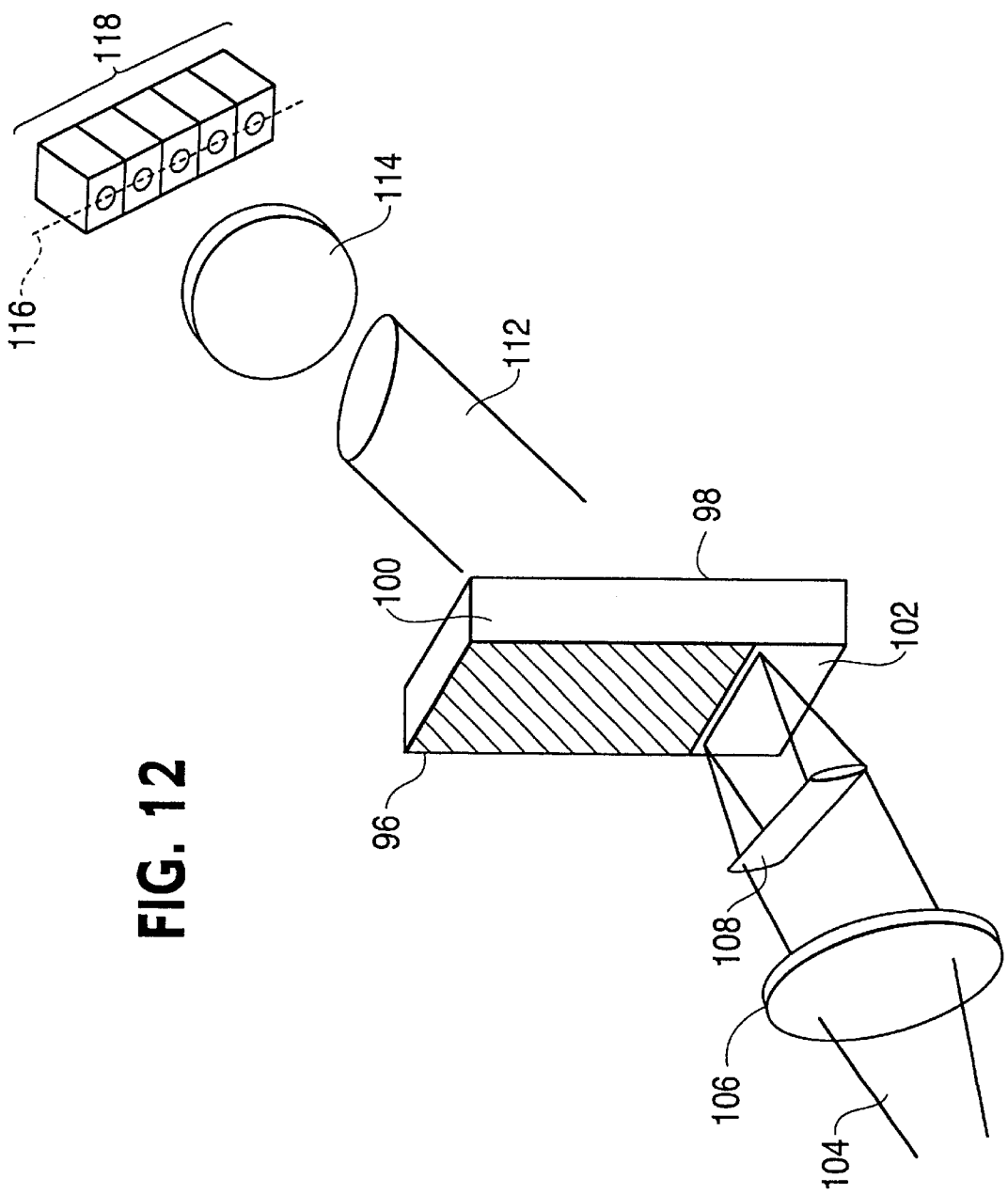
FIG. 12 is a diagram illustrating a VIPA as used with a receiver, according to an additional embodiment of the present invention.

FIG. 12 is a diagram illustrating a VIPA as used with a receiver, according to an additional embodiment of the present invention. The VIPA illustrated in FIG. 12 is similar to the VIPA illustrated in FIG. 11, except that the reflectances of reflecting films 96 and 98 are reversed. More specifically, in the VIPA illustrated in FIG. 12, reflecting film 98 has a reflectance of approximately 95% and reflecting film 96 has a reflectance of approximately 100%. As illustrated in FIG. 12, luminous flux 112 is formed through interference of output light travelling through reflecting film 98. Thus, the input light enters one side of parallel plate 100, and luminous flux 112 is formed on the opposite side of parallel plate 100. Otherwise, the VIPA illustrated in FIG. 12 operates in a similar manner as the VIPA illustrated in FIG. 11.

Figure 13:
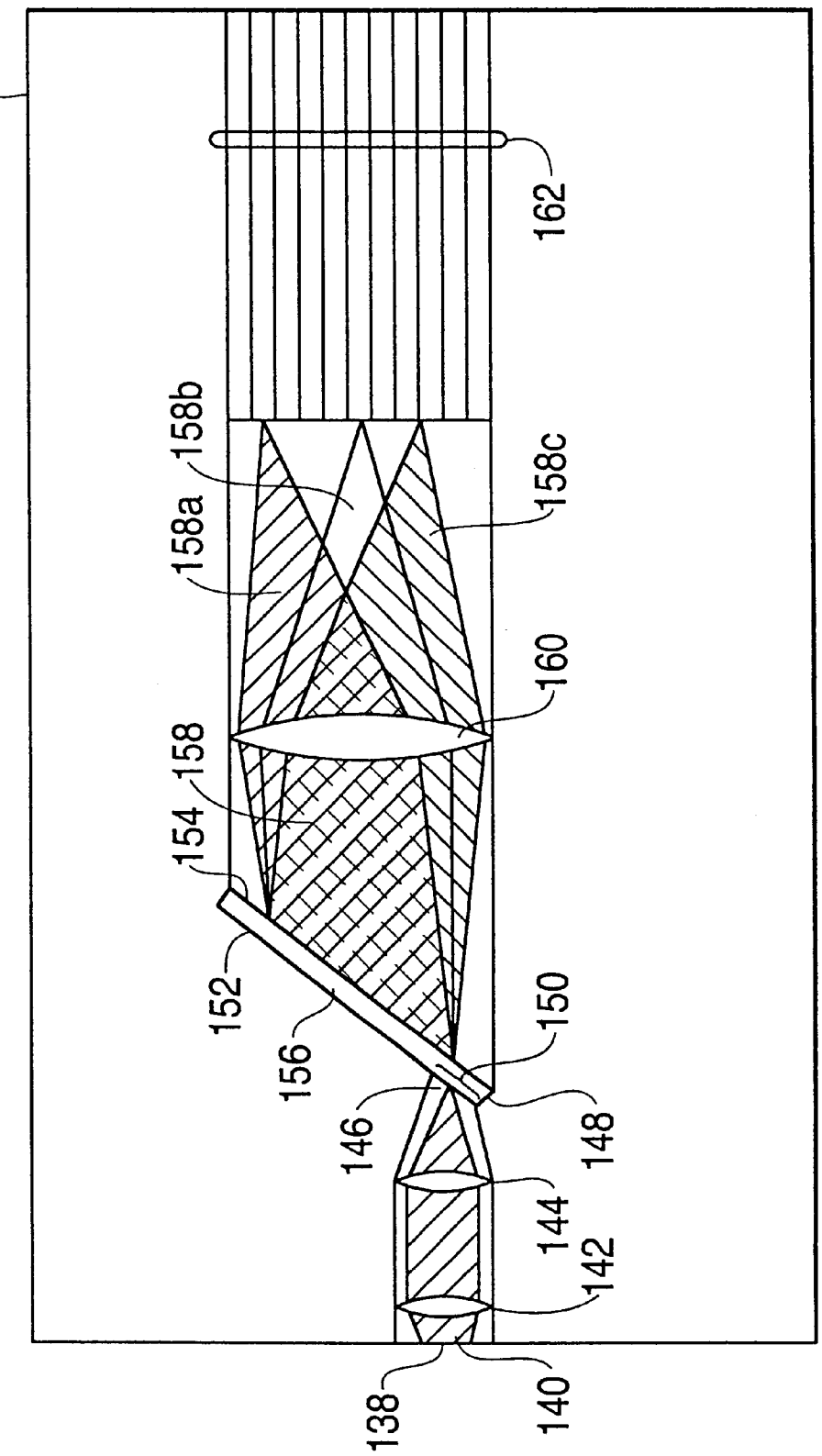
FIG. 13 is a diagram illustrating a waveguide type VIPA, according to an embodiment of the present invention.

FIG. 13 is a diagram illustrating a waveguide type VIPA, according to an embodiment of the present invention. Referring now to FIG. 13, light 138 is output from an optical fiber (not illustrated) and received by a waveguide 140 provided on a substrate 142. Waveguide 140 is, for example, lithium niobate. Light 138 contains optical signals modulated on a plurality of carriers having different wavelengths.

Light 138 typically has a dispersed width as it is output from the optical fiber. Therefore, a collimating lens 142 converts light 138 into parallel light. The parallel light is then collected by a cylindrical lens 144 and focused into a focal line 146. The light then radiates into a VIPA 148 from focal line 146 through a radiation window 150.

VIPA 148 comprises reflecting films 152 and 154 on a parallel plate 156. Reflecting film 154 is on one side of a parallel plate 156, and reflecting film 152 and radiation window 150 are on the other side of parallel plate 156. Reflecting film 152 has a reflectance of approximately 100%, and reflecting film 154 has a reflectance of less than 100%. A luminous flux 158 of light reflected by parallel plate 156 is output to the side of parallel plate 156 opposite to radiation window 150.

If input light 138 includes a plurality of wavelengths, a plurality of luminous fluxes 158 will be formed which travel in different directions depending of the wavelengths of input light 138. Luminous flux 158 formed by VIPA 148 is focused by a lens 160 at different points, depending on the propagation direction of luminous flux 158. Therefore, as illustrated in FIG. 13, luminous fluxes 158a, 158b and 158c having wavelengths $\lambda 1$, $\lambda 2$, and $\lambda 3$, respectively, are formed at different collection points.

A plurality of receiving waveguides 162 are provided at the collection points. Each receiving waveguide 162 guides an optical signal and corresponding carrier having a single wavelength. Therefore, a plurality of luminous fluxes can be simultaneously received and transmitted through various channels. Each receiving waveguide 162 has a corresponding receiver (not illustrated) provided at a later stage. The receiver is typically a photodiode. Therefore, light guided by each receiving waveguides 162 is processed after being detected by the corresponding receiver.

Unfortunately, with a VIPA according to the above embodiments of the present invention, the beam profile of the resulting luminous flux may not be an optimal beam profile.

For example, FIG. 14(A) is a diagram illustrating the operation of VIPA 76 in FIG. 7, and FIG. 14(B) is a diagram illustrating the beam profile of the VIPA.

Referring now to FIGS. 14(A) and 14(B), input light 77 undergoes multiple reflection between reflecting films 122 and 124. For this example, it can be assumed that reflecting film 124 has a reflectivity of approximately 100%, and that reflecting film 122 has a constant reflectivity of 95%. The multiple reflection between reflecting films 122 and 124 will cause input light 77 to decay in VIPA 76. Therefore, the resulting luminous flux produced by VIPA 76 will decay along the surface of reflecting film 122, as shown in FIG. 14(B). Thus, the coupling efficiency of the luminous flux to an optical fiber may not be very high. To solve this problem, the reflectivity of reflecting film 122 can be varied.

For example, FIG. 15(A) is a diagram illustrating the operation of VIPA 76, according to an additional embodiment of the present invention, and FIG. 15(B) is a diagram illustrating the beam profile of the VIPA in FIG. 15(A), according to an embodiment of the present invention.

Referring now to FIG. 15(A), for this example, it can be assumed that reflecting film 124 has a reflectivity of approximately 100%. Moreover, the reflectivity of reflecting film 122 varies so that the beam profile of the resulting luminous flux has an approximately symmetrical beam profile such as the approximate bell curve illustrated, for example, in FIG. 15(B). For example, the reflectivity of reflecting film 122 can be varied so that only a small portion of light passes through reflecting film 122 at a beginning incident position 180 of input light 77 on reflecting film 122, and so that more light passes through reflecting film 122 at an ending incident position 182 of the multiple reflected input light 77 on reflecting film 122. More specifically, the reflectivity of reflecting film 122 preferably varies so that there is a higher reflectivity near beginning incident position 180 (thereby allowing less light to be transmitted through reflecting film 122 at beginning incident position 180) and a lower reflectivity near ending incident position 182 (thereby allowing more light to be transmitted through reflecting film 122 at ending incident position 182).

For example, reflecting film 122 can have a reflectivity of approximately 99% or more at beginning incident position 180, and decrease down to a reflectivity of approximately 80% at ending incident position 182. However, the present invention is not intended to be limited to this range of reflectivity. Reflecting film 122 can be designed to change continuously in reflectivity from beginning incident position 180 to ending incident position 182.

Therefore, as input light 77 is reflected multiple times between reflecting films 122 and 124, a light incident position of input light 77 on reflecting film 122 moves from beginning incident position 180 to ending incident position 182. The reflectivity decreases along reflecting film 122 from beginning incident position 180 to ending incident position 182 so that the resulting luminous flux has an approximately symmetric beam profile along reflecting film 122. Such a beam profile is shown in FIG. 15(B).

Figure 16A:
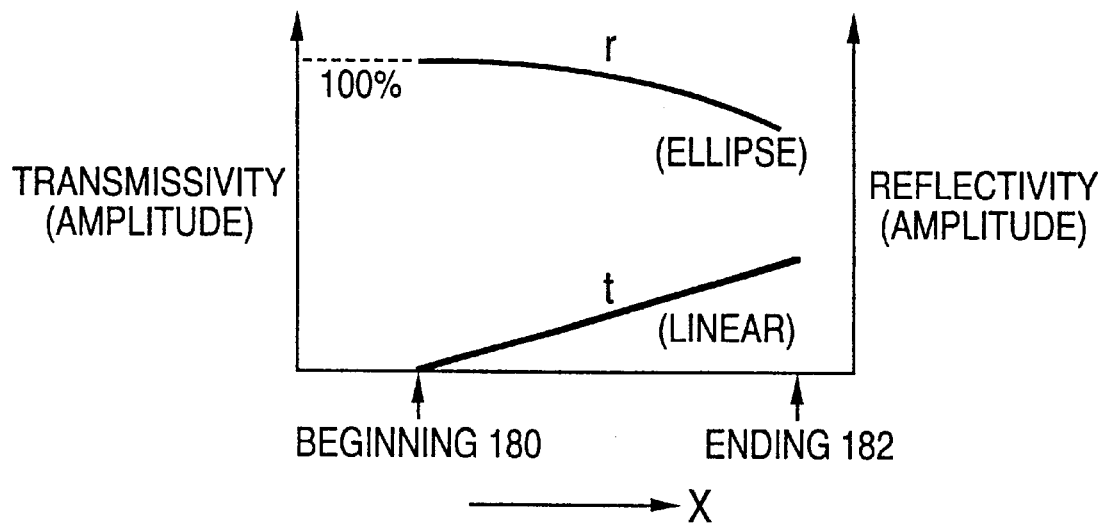
FIG. 16(A) is a graph illustrating an example of a reflectivity curve (r) and a transmissivity curve (t)
Figure 16B:
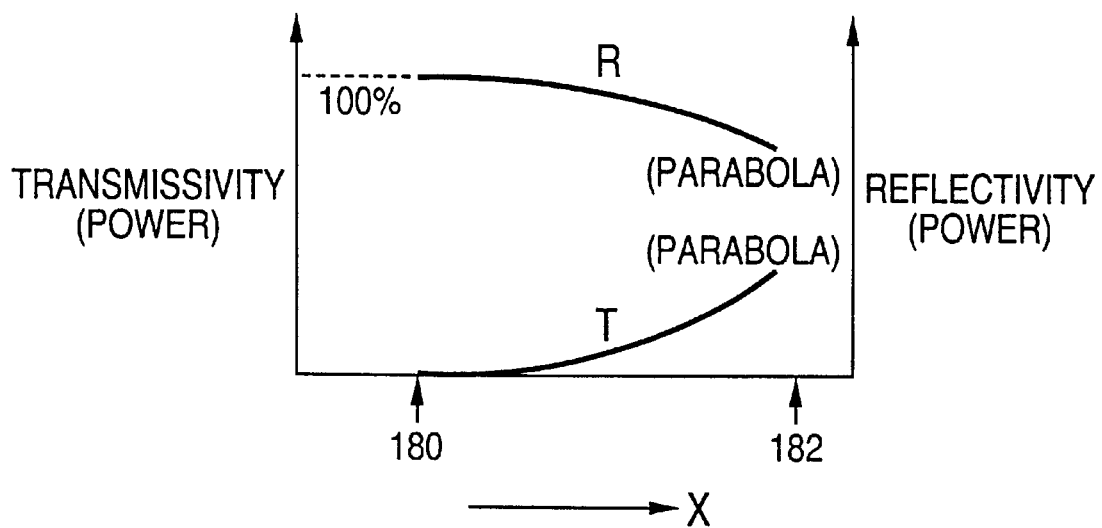
FIG. 16(B) is a graph illustrating a corresponding power reflectivity curve (R) and power transmissivity curve (T), of a VIPA, according to an embodiment of the present invention.

FIG. 16(A) is a graph illustrating an example of a reflectivity curve (r) and a transmissivity curve (t) for reflecting film 122, and FIG. 16(B) is a graph illustrating a corresponding power reflectivity curve (R) and power transmissivity curve (T), according to an embodiment of the present invention. Here, it should be noted that, generally:

$T=t^2$ $R=r^2$ (power is the square of amplitude)

$T+R=1$

If t is linear, $t=kx$, where k is a constant. Then, $T=k^2x^2$ (parabola), $R=1-k^2x^2$ (parabola) and $r=$square root $(1-k^2x^2)$ (ellipse).

Therefore, referring to FIGS. 16(A) and 16(B), assume that reflecting film 122 has a reflectivity as indicated by reflectivity curve (r) in FIG. 16(A), and that amplitude transmissivity changes linearly along the surface of reflecting film 122, as indicated by transmissivity curve (t) in FIG. 16(A). Then, as indicated by the above equations, the power transmissivity curve (T) in FIG. 16(B) is parabolic, since power is square of amplitude. The power reflectivity curve (R) in FIG. 16(A) is also parabolic, since power reflectivity is one minus power transmissivity. Using the power reflectivity curve (R), the output beam couples to an optical fiber almost perfectly, whereas a VIPA with a constant reflectivity would have 20% loss or 80% coupling efficiency.

With a linear change in amplitude transmissivity as shown by transmissivity curve (t), the output beam profile is not exactly symmetric, but is approximately symmetric. However, this practical design will provide a very high performance. Of course, a more sophisticated design may provide a perfect symmetric output or exact Gaussian shape. However, a complicated reflectivity curve of such a design may be impractical.

While the reflectivity changes along reflecting film 122, the optical phase through reflection by reflecting film 122 should preferably be maintained constant.

FIG. 17 is a diagram illustrating a VIPA having a phase adjustment buffer layer 184 which maintains the optical phase through reflection to be substantially constant, that is, uniform, according to an embodiment of the present invention. Phase adjustment buffer layer 184 is preferably positioned between reflecting films 122 and 124, and adjacent to, or on, reflecting film 122. The thickness of phase adjustment buffer layer 184 changes along the surface so that the optical phase of light transmitted through phase adjustment buffer layer 184 changes to cancel the optical phase change through the reflection in reflecting film 122.

Phase adjustment buffer layer 184 represents a preferred embodiment for changing the phase of the reflected light. However, the present invention is not intended to be limited to this specific embodiment, and other mechanisms can be used to change the phase of the reflected light.

Moreover, the optical phase in the lights transmitted through reflecting film 122 should preferably be maintained constant.

Figure 18:
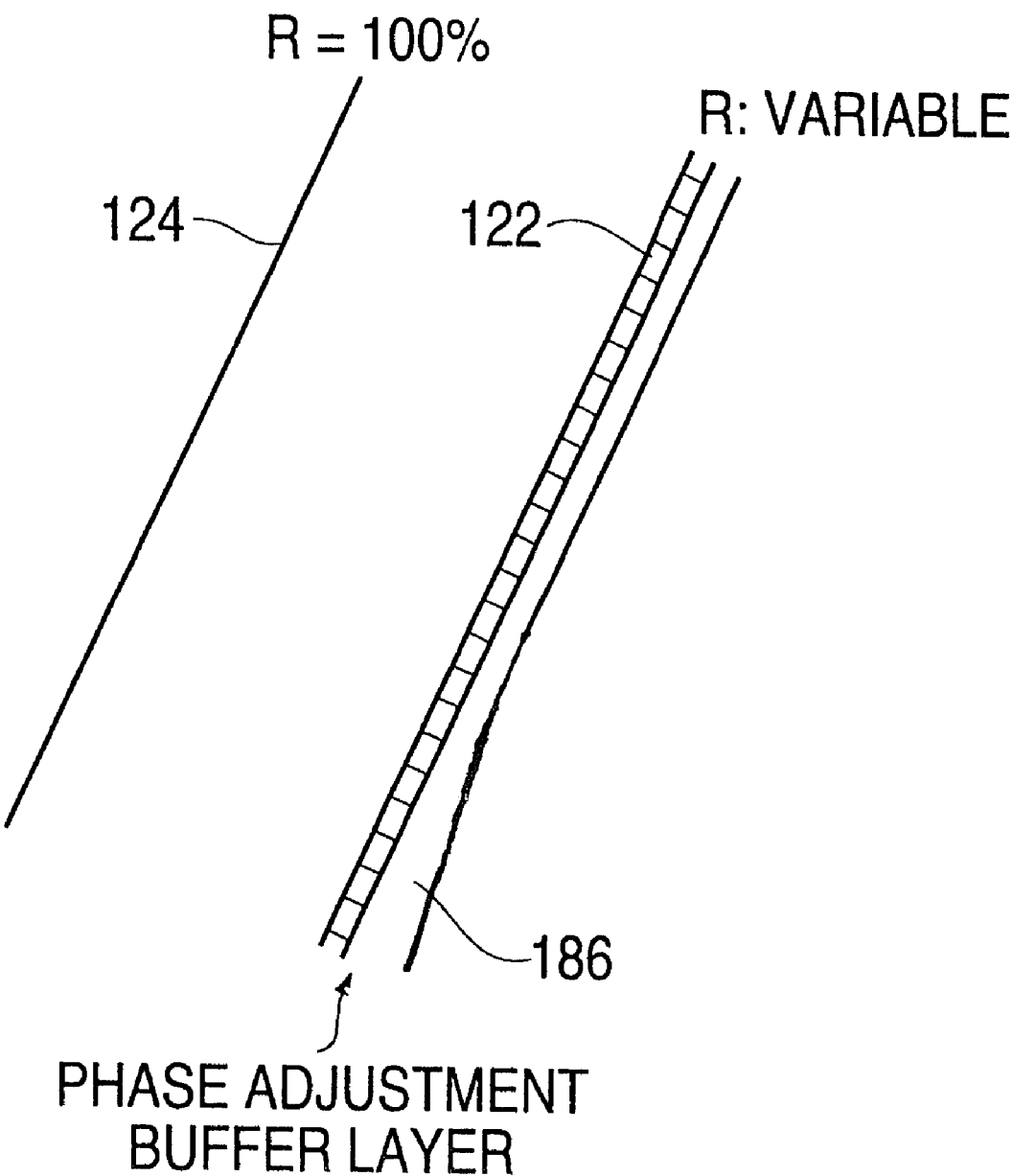
FIG. 18 is a diagram illustrating a VIPA having a phase adjustment buffer layer which maintains the optical phase of transmitted lights to be substantially uniform, according to an embodiment of the present invention.

FIG. 18 is a diagram illustrating a VIPA having a phase adjustment buffer layer 186 which maintains the optical phase of lights transmitted through reflecting film 122 to be substantially constant, that is, uniform, according to an embodiment of the present invention. Phase adjustment buffer layer 186 is preferably positioned along reflecting film 122, and to an opposite side from reflecting film 124. The thickness of phase adjustment buffer layer 186 changes along the surface to cancel the phase change induced through reflecting film 122.

Phase adjustment buffer layer 186 represents a preferred embodiment for changing the phase of the transmitted light. However, the present invention is not intended to be limited to this specific embodiment, and other mechanisms can be used to change the phase of the transmitted light.

According to the above embodiments of the present invention, a VIPA includes first and second reflecting surfaces (such as reflecting films 124 and 122, respectively, in FIG. 15(A)). The second surface has a reflectivity which causes a portion of light incident thereon to be transmitted therethrough. The VIPA receives an input light at a respective wavelength within a continuous range of wavelengths. The first and second surfaces are positioned so that the input light is reflected a plurality of times between the first and second surfaces to cause a plurality of lights to be transmitted through the second surface. The plurality of transmitted lights interfere with each other to produce an output light (such as a luminous flux 82a or 82b in FIG. 6) which is spatially distinguishable from an output light produced for an input light having any other wavelength within the continuous range of wavelengths. The reflectivity of the second surface varies along the second surface so that the output light has a desired beam profile along the second surface (see, for example, reflecting film 122 in FIG. 15(A) and the beam profile in FIG. 15(B)). A phase adjustment buffer layer can be provided to cause lights reflected from the second surface to the first surface to have a uniform optical phase. Further, a phase adjustment layer can be provided to cause the transmitted lights to have a uniform optical phase.

According to the above embodiments of the present invention, the reflectivity of a surface of a VIPA varies, to provide a desired beam profile. In various of the above embodiments of the present invention, the desired beam profile is described as being symmetric. However, there may be situations in which different beam profiles such as, for example, an asymmetric or a double-hump shaped profile, is required. Therefore, the reflectivity is not intended to be limited to providing a symmetric beam profile. Instead, the reflectivity can be designed to provide many different types of desired beam profiles, such as, for example, a symmetric, an asymmetric, a Gaussian, an approximate bell curve, or a double-hump shaped beam profile. A double-hump shaped beam profile is disclosed, for example, in U.S. application Ser. No. 08/802,767, filed Feb. 21, 1997, titled "OPTICAL COMPONENT WHEREIN EITHER AN OPTICAL FIELD DISTRIBUTION OF RECEIVED LIGHT OR AN OPTICAL FIELD DISTRIBUTION OF A PROPAGATION MODE OF A RECEIVING WAVEGUIDE HAS A DOUBLE-HUMP SHAPE", and which is incorporated herein by reference.

An apparatus which includes a VIPA in combination with a reflecting device, such as a mirror, can be used to produce chromatic dispersion. For example, FIGS. 19–23 are diagrams illustrating an apparatus which uses a VIPA as an angular dispersive component to produce chromatic dispersion. Such an apparatus is disclosed in more detail in U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION", and also in U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION", which are incorporated herein by reference.

Figure 19:
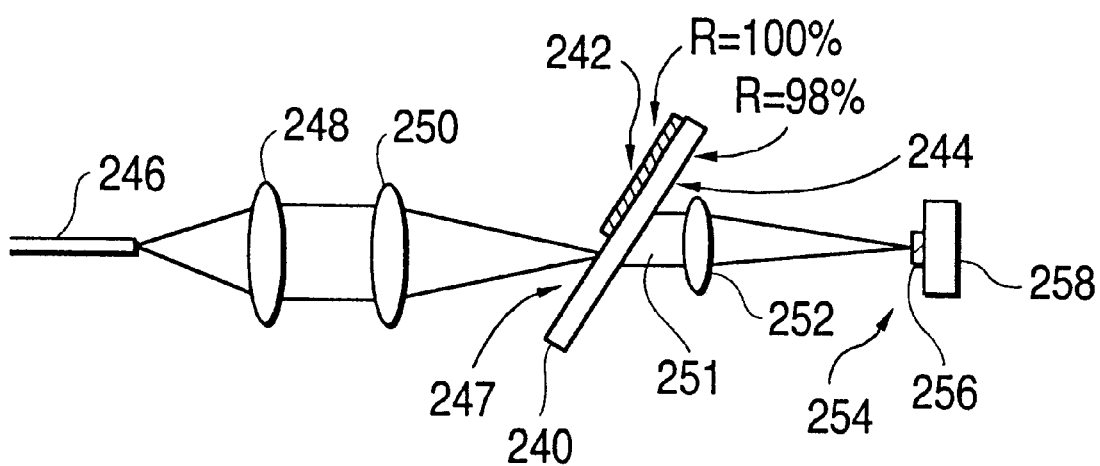
FIG. 19 is a diagram illustrating an apparatus which uses a VIPA as an angular dispersive component to produce chromatic dispersion, according to an embodiment of the present invention.

For example, referring now to FIG. 19, a VIPA 240 has a first surface 242 with a reflectivity of, for example, approximately 100%, and a second surface 244 with a reflectivity of, for example, approximately 98%. VIPA 240 also includes a radiation window 247. However, VIPA 240 is not intended to be limited to this specific configuration. Instead, VIPA 240 can have many different configurations as described herein.

As illustrated in FIG. 19, a light is output from a fiber 246, collimated by a collimating lens 248 and line-focused into VIPA 240 through radiation window 247 by a cylindrical lens 250. VIPA 240 then produces a collimated light 251 which is focused by a focusing lens 252 onto a mirror 254. Mirror 254 can be a mirror portion 256 formed on a substrate 258.

Mirror 254 reflects the light back through focusing lens 252 into VIPA 240. The light then undergoes multiple reflections in VIPA 240 and is output from radiation window 247. The light output from radiation window 247 travels through cylindrical lens 250 and collimating lens 248 and is received by fiber 246.

Therefore, light is output from VIPA 240 and reflected by mirror 254 back into VIPA 240. The light reflected by mirror 254 travels through the path which is exactly opposite in direction to the path through which it originally travelled. As will be seen in more detail below, different wavelength components in the light are focused onto different positions on mirror 254, and are reflected back to VIPA 240. As a result, different wavelength components travel different distances, to thereby produce chromatic dispersion.

Figure 20:
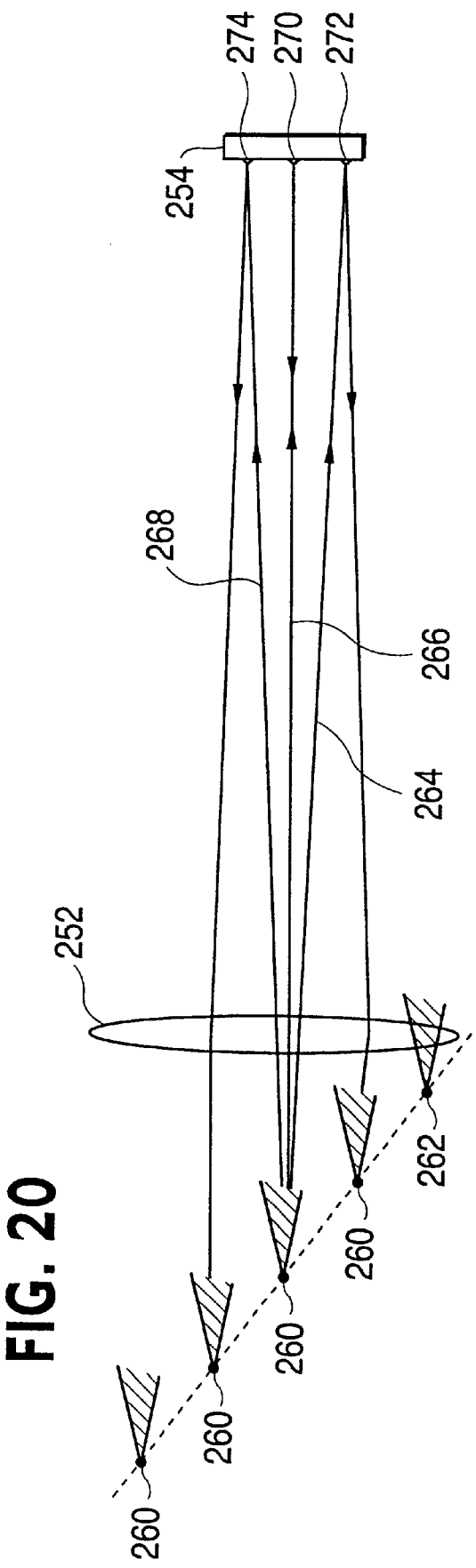
FIGS. 20–23 are diagrams illustrating the operation of the apparatus in FIG. 19, according to an embodiment of the present invention.

FIG. 20 is a more detailed diagram illustrating the operation of the VIPA in FIG. 19, according to an embodiment of the present invention. Assume a light having various wavelength components is received by VIPA 240. As illustrated in FIG. 20, VIPA 240 will cause the formation of virtual images 260 of beam waist 262, where each virtual image 260 emits light.

As illustrated in FIG. 20, focusing lens 252 focuses the different wavelength components in a collimated light from VIPA 240 at different points on mirror 254. More specifically, a longer wavelength 264 focuses at point 272, a center wavelength 266 focuses at point 270, and a shorter wavelength 268 focuses at point 274. Then, longer wavelength 264 returns to a virtual image 260 which is closer to beam waist 262, as compared to center wavelength 266. Shorter wavelength 268 returns to a virtual image 260 which is farther from beam waist 262, as compared to center wavelength 266. Thus, the arrangement provides for normal dispersion.

Mirror 254 is designed to reflect only light in a specific interference order, and light in any other interference order should be focused out of mirror 254. More specifically, as previously described, a VIPA will output a collimated light. This collimated light will travel in a direction in which the path from each virtual image has a difference of $m\lambda$, where m is an integer. The math order of interference is defined as an output light corresponding to m.

Figure 21:
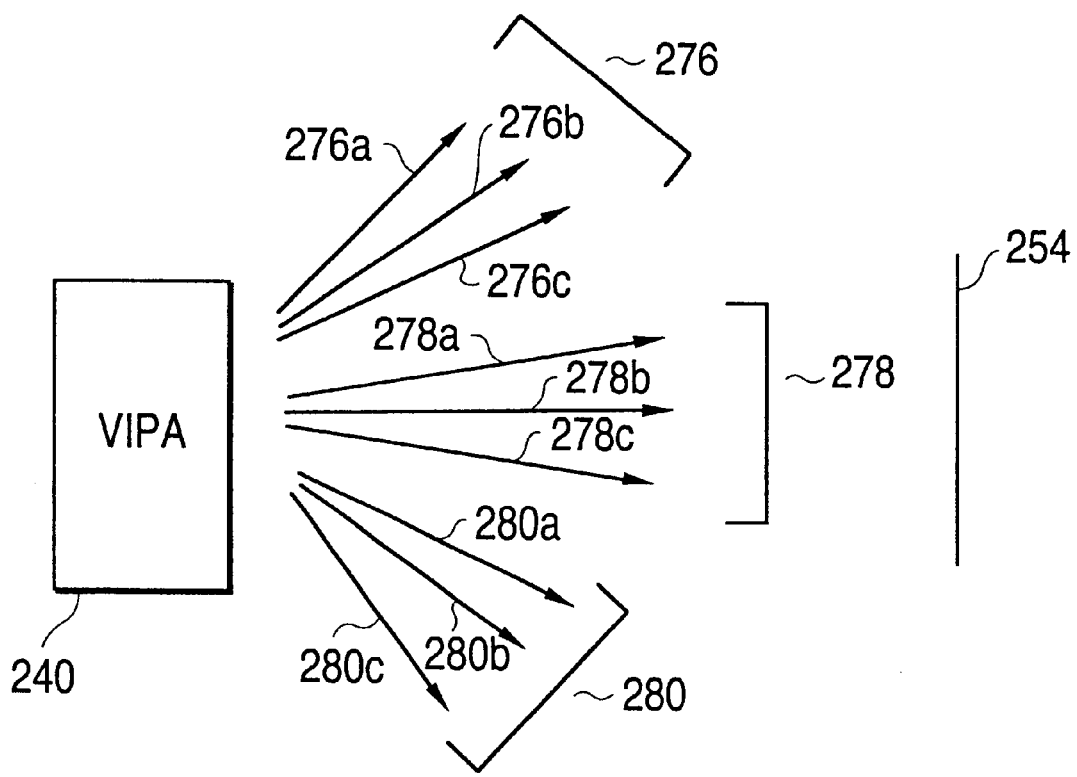

For example, FIG. 21 is a diagram illustrating various orders of interference of a VIPA. Referring now to FIG. 21, a VIPA, such as VIPA 240, emits collimated lights 276, 278 and 280. Each collimated light 276, 278 and 280 corresponds to a different interference order. Therefore, for example, collimated light 276 is collimated light corresponding to an (n+2)th interference order, collimated light 278 is collimated light corresponding to an (n+1)th interference order, and collimated light 280 is collimated light corresponding to an nth interference order, wherein n is an integer. Collimated light 276 is illustrated as having several wavelength components 276a, 276b and 276c. Similarly, collimated light 278 is illustrated as having wavelength components 278a, 278b and 278c, and collimated light 280 is illustrated as having wavelength components 280a, 280b and 280c. Here, wavelength components 276a, 278a and 280a have the same wavelength. Wavelength components 276b, 278b and 280b have the same wavelength (but different from the wavelength of wavelength components 276a, 278a and 280a). Wavelength components 276c, 278c and 280c have the same wavelength (but different from the wavelength of wavelength components 276a, 278a and 280a, and the wavelength of wavelength components 276b, 278b and 280b). Although FIG. 21 only illustrates collimated light for three different interference orders, collimated lights will be emitted for many other interference orders.

Since collimated lights at the same wavelength for different interference orders travel in different directions and are therefore focused at different positions, mirror 254 can be made to reflect only light from a single interference order back into VIPA 240. For example, as illustrated in FIG. 21, the length of a reflecting portion of mirror 254 to should be made relatively small, so that only light corresponding to a single interference order is reflected. More specifically, in FIG. 21, only collimated light 278 is reflected by mirror 254. In this manner, collimated lights 276 and 278 are focused out of mirror 254.

A wavelength division multiplexed light usually includes many channels. Referring again to FIG. 19, if the thickness t between first and second surfaces 242 and 244 of VIPA 240 is set at a specific value, the arrangement will be able to simultaneously compensate for dispersion in each channel.

More specifically, each channel has a center wavelength. These center wavelengths are usually spaced apart by a constant frequency spacing. The thickness t of VIPA 240 between first and second surfaces 242 and 244 should be set so that all of the wavelength components corresponding to the center wavelengths have the same output angle from VIPA 240 and thus the same focusing position on mirror 254. This is possible when the thickness t is set so that, for each channel, the round-trip optical length through VIPA 240 travelled by the wavelength component corresponding to the center wavelength is a multiple of the center wavelength of each channel. This amount of thickness t will hereafter be referred to as the "WDM matching free spectral range thickness", or "WDM matching FSR thickness".

Moreover, in this case, the round-trip optical length (2nt cos θ) through VIPA 240 is equal to the wavelength corresponding to the center wavelength in each channel multiplied by an integer for the same θ and different integer, where n is the refractive index of the material between first and second surfaces 242 and 244, θ indicates a propagation direction of a luminous flux corresponding to the center wavelength of each channel. More specifically, as previously described, θ indicates the propagation direction of a resulting luminous flux as measured from a line perpendicular to the surface of reflecting surfaces 122 and 124.

Therefore, all of the wavelength components corresponding to the center wavelengths will have the same output angle from VIPA 240 and thus the same focusing position on mirror 254, if t is set so that, for the wavelength component corresponding to the center wavelength in each channel, 2nt cos θ is an integer multiple of the center wavelength of each channel for the same θ and different integer.

For example, a 2 mm physical length in round trip (which is approximately double a 1 mm thickness of VIPA 240) and a refractive index of 1.5 enable all the wavelengths with a spacing of 100 GHz to satisfy this condition. As a result, VIPA 240 can compensate for dispersion in all the channels of a wavelength division multiplexed light at the same time.

Therefore, referring to FIG. 20, with the thickness t set to the WDM matching FSR thickness, VIPA 240 and focusing lens 252 will cause (a) the wavelength component corresponding to the center wavelength of each channel to be focused at point 270 on mirror 254, (b) the wavelength component corresponding to the longer wavelength component of each channel to be focused at point 272 on mirror 254, and (c) the wavelength component corresponding to the shorter wavelength component of each channel to be focused at point 274 on mirror 254. Therefore, VIPA 240 can be used to compensate for chromatic dispersion in all channels of a wavelength division multiplexed light.

Figure 22:
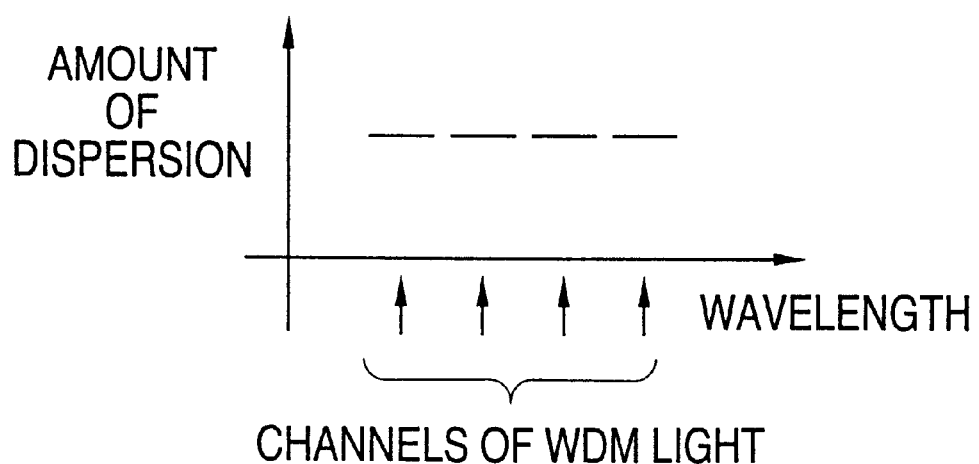

FIG. 22 is a graph illustrating the amount of dispersion of several channels of a wavelength division multiplexed light, in a case when the thickness t is set to the WDM matching FSR thickness, according to an embodiment of the present invention. As illustrated in FIG. 22, all the channels are provided with the same dispersion. However, the dispersions are not continuous between the channels. Moreover, the wavelength range for each channel at which VIPA 240 will compensate for dispersion can be set by appropriately setting the size of mirror 254.

If the thickness t is not set to the WDM matching FSR thickness, different channels 20 of a wavelength division multiplexed light will be focused at different points on mirror 254. For example, if the thickness t is one-half, one-third or some other fraction of the round trip optical length thickness, then focusing points of two, three, four or more channels may be focused on the same mirror, with each channel being focused at a different focusing point. More specifically, when the thickness t is one-half the WDM matching FSR thickness, the light from odd channels will focus at the same points on mirror 254, and the light from even channels will focus at the same points on mirror 254. However, the lights from the even channels will be focused at different points from the odd channels.

Figure 23:
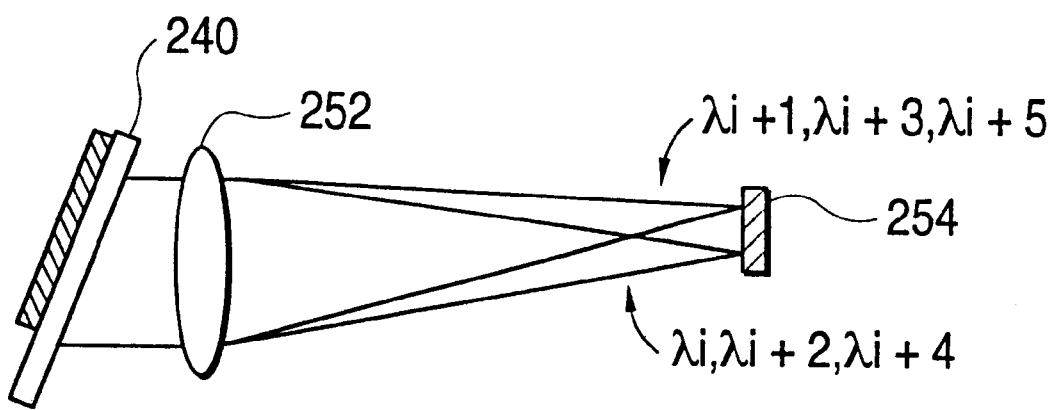

For example, FIG. 23 is a diagram illustrating different channels being focused at different points on mirror 254. As illustrated in FIG. 23, wavelength components of the center wavelength of even channels are focused at one point on mirror 254, and wavelength components of the center wavelength of odd channels are focused at a different point. As a result, VIPA 240 can adequately compensate for dispersion in all the channels of a wavelength division multiplexed light at the same time.

In FIG. 19–23, fiber 246 acts as both an input fiber to provide the light to VIPA 240, and as an output fiber to receive the returned light back from VIPA 240. However, in various designs, an input fiber may be a separate fiber than the output fiber. Thus, the input and output fibers may be spatially separated from each other.

Second surface 244 of VIPA 240 in FIGS. 19–23 is described has having a reflectivity of, for example, approximately 98%. However, the VIPA can be designed to have a surface with varying reflectivity to produce a desired beam profile, as described above. For example, second surface 244 can have a varying reflectivity which minimizes loss in the apparatus, or increases coupling efficiency from the input fiber to the output fiber. For example, second surface 244 can have a varying reflectivity to produce a desired beam profile which reduces loss occurring as light travels along the total path of fiber 246, to VIPA 240, to mirror 254, back to VIPA 240 and then back to fiber 246.

To reduce loss and provide the highest coupling efficiency, second surface 244 should preferably provides a beam profile having a Gaussian or an approximate bell curve shape.

Therefore, as indicated above, a VIPA has a reflecting surface with a varying reflectivity which produces a desired beam profile. For example, the reflecting surface can have a varying reflectivity which produces an output beam having an approximately symmetric beam profile along the reflecting surface, an approximate bell curve beam profile along the reflecting surface, an approximate Gaussian beam profile along the reflecting surface, an asymmetric beam profile along the reflecting surface, or a doublehump shaped beam profile along the reflecting surface. Such beam profile shapes would be understood by a person of skill in the art. Moreover, based on the above description, a person of skill in the art would know how to form a reflecting surface which produces the desired beam profile.

According to the above embodiments of the present invention, a VIPA is described as being formed by a parallel plate, or by two reflecting surfaces in parallel with each other. However, the plate or reflecting surfaces do not necessarily have to be parallel.

According to the above embodiments of the present invention, a light which includes a plurality of wavelengths can be simultaneously divided. Therefore, a receiver for use in wavelength multiplexing communications can be successfully reduced in size.

According to the above embodiments of the present invention, a VIPA can simultaneously split a wavelength multiplexed light for each wavelength of input light. Moreover, the angle of dispersion can be adjusted by the thickness t of the parallel plate forming the VIPA. As a result, the angle of dispersion can be made large enough to allow a receiver to easily receive each split signal. For example, a conventional diffraction grating requires a fine concavo-convex surface for a large angle of dispersion. However, it is very difficult to prepare a fine and precise concavo-convex surface, thereby limiting the size of the angle of dispersion. By contrast, a VIPA according to the above embodiments of the present invention only requires a change in thickness of the parallel plate to realize a relatively large angle of dispersion.

Moreover, a VIPA according to the above embodiments of the present invention produces a larger angle of dispersion than a conventional diffraction grating. Therefore, a receiver which uses a VIPA according to the above embodiments of the present invention can correctly receive an optical signal, without fail, even in wavelength multiplexing communications realizing high-level multiplexing processes. Furthermore, such a receiver has a relatively simple construction and is relatively inexpensive to produce.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

Moreover, as compared to an array waveguide grating, a VIPA according to the above embodiments of the present invention requires a relatively simple configuration and achieves stable optical characteristics and resistance to changes in environmental conditions.

In the above embodiments of the present invention, a VIPA has reflecting films to reflect light. For example, FIG. 7 illustrates a VIPA 76 having reflecting films 122 and 124 to reflect light. However, it is not intended for a VIPA to be limited to the use of "film" to provide a reflecting surface. Instead, the VIPA must simply have appropriate reflecting surfaces, and these reflecting surfaces may or may not be formed by "film".

Further, in the above embodiments of the present invention, a VIPA includes a transparent glass plate in which multiple reflection occurs. For example, FIG. 7 illustrates a VIPA 76 having a transparent glass plate 120 with reflecting surfaces thereon. However, it is not intended for a VIPA to be limited to the use of a glass material, or any type of "plate", to separate the reflecting surfaces. Instead, the reflecting surfaces must simply be separated from each other. For example, the reflecting surfaces of a VIPA can simply have "air" therebetween, instead of a glass plate, with the reflecting surfaces stably sustained by a material such as glass or metal with low thermal expansion. Therefore, the reflecting surfaces can be described as having a transparent material therebetween which is, for example, optical glass or air.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   first and second surfaces, the second surface having a reflectivity which causes a portion of light incident thereon to be transmitted therethrough, the reflectivity of the second surface varying along the second surface, wherein
      the apparatus receives an input light at a respective wavelength within a continuous range of wavelengths, and
      the first and second surfaces are positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

2. An apparatus as in claim 1, wherein,
   as the input light is reflected said plurality of times between the first and second surfaces, a light incident position of the input light on the second surface moves from a beginning incident position to an ending incident position, and
   the reflectivity decreases along the second surface from the beginning incident position to the ending incident position.

3. An apparatus as in claim 1, wherein,
   as the input light is reflected said plurality of times between the first and second surfaces, a light incident position of the input light on the second surface moves from a beginning incident position to an ending incident position, and
   the reflectivity decreases along the second surface from the beginning incident position to the ending incident position so that the output light has an approximately symmetric beam profile along the second surface.

4. An apparatus as in claim 1, wherein
   as the input light is reflected said plurality of times between the first and second surfaces, reflection by the second surface defines a plurality of reflected lights travelling from the second surface to the first surface, and
   the plurality of reflected lights have a uniform optical phase along the second surface.

5. An apparatus as in claim 1, wherein
   as the input light is reflected said plurality of times between the first and second surfaces, reflection by the second surface defines a plurality of reflected lights travelling from the second surface to the first surface, and
   the apparatus further comprises means for causing the plurality of reflected lights to have a uniform optical phase along the second surface.

6. An apparatus as in claim 1, wherein
   as the input light is reflected said plurality of times between the first and second surfaces, reflection by the second surface defines a plurality of reflected lights travelling from the second surface to the first surface, and
   the apparatus further comprises a phase adjustment layer causing the plurality of reflected lights to have a uniform optical phase along the second surface.

7. An apparatus as in claim 6, wherein the phase adjustment layer is provided along the second surface and between the first and second surfaces.

8. An apparatus as in claim 1, wherein the plurality of transmitted lights have a uniform optical phase along the second surface.

9. An apparatus as in claim 1, further comprising a phase adjustment layer which causes the plurality of transmitted lights to have a uniform optical phase along the second surface.

10. An apparatus as in claim 9, wherein the phase adjustment layer is along the second surface and to an opposite side from the first surface.

11. An apparatus as in claim 1, further comprising:
    means for causing the plurality of transmitted lights to have a uniform optical phase along the second surface.

12. An apparatus as in claim 1, wherein the first surface has a reflectivity of substantially 100%.

13. An apparatus as in claim 1, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

14. An apparatus as in claim 1, wherein the input light is focused to a line between the first and second surfaces, to be reflected a plurality of times between the first and second surfaces.

15. An apparatus as in claim 1, wherein the reflectivity of the second surface varies along the second surface so that the output light has a beam profile which is one of the group consisting of:
- an approximately symmetric beam profile along the second surface,
- an approximate bell curve beam profile along the second surface,
- an approximate Gaussian beam profile along the second surface,
- an asymmetric beam profile along the second surface, and
- a double-hump shaped beam profile along the second surface.

16. An apparatus as in claim 1, further comprising:
a light returning device which causes the output light to be returned to the second surface and pass therethrough so that the returned output light undergoes multiple reflection between the first and second surfaces.

17. An apparatus as in claim 16, wherein the light returning device is a mirror.

18. An apparatus as in claim 16, wherein the light returning device comprises:
- a mirror; and
- a lens which focuses the output light onto the mirror so that the mirror reflects the output light, the reflected output light being directed by the lens back to the second surface.

19. An apparatus as in claim 16, further comprising:
a window through which the apparatus receives the input light and through which the returned output light is output from the apparatus after undergoing multiple reflection between the first and second surfaces.

20. An apparatus as in claim 1, wherein the first surface allows substantially no light to pass therethrough, and the first and second surfaces are parallel to each other.

21. An apparatus as in claim 20, further comprising:
a radiation window in the same plane as the first surface, the input light passing through the radiation window to be received between the first and second surfaces and then reflected said plurality of times between the first and second surfaces.

22. An apparatus as in claim 21, wherein the output light is angularly dispersed in relation to the second surface in accordance with the wavelength of the input light, to thereby be said spatially distinguishable.

23. An apparatus as in claim 20, wherein the output light is angularly dispersed in relation to the second surface in accordance with the wavelength of the input light, to thereby be said spatially distinguishable.

24. An apparatus as in claim 1, wherein the output light is angularly dispersed in relation to the second surface in accordance with the wavelength of the input light, to thereby be said spatially distinguishable.

25. An apparatus comprising:
- first and second surfaces in parallel with each other, the first surface having a reflectivity which allows substantially no light to pass therethrough, the second surface having a reflectivity which causes a portion of light incident thereon to be transmitted therethrough, the reflectivity of the second surface varying along the second surface; and
- a radiation window in the same plane as the first surface, wherein
  - an input light at a respective wavelength within a continuous range of wavelengths passes through the radiation window to be received between the first and second surfaces, the first and second surfaces being positioned so that the received input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

26. An apparatus as in claim 25, wherein,
as the input light is reflected said plurality of times between the first and second surfaces, a light incident position of the input light on the second surface moves from a beginning incident position to an ending incident position, and
the reflectivity decreases along the second surface from the beginning incident position to the ending incident position.

27. An apparatus as in claim 25, wherein,
as the input light is reflected said plurality of times between the first and second surfaces, a light incident position of the input light on the second surface moves from a beginning incident position to an ending incident position, and
the reflectivity decreases along the second surface from the beginning incident position to the ending incident position so that the output light has an approximately symmetric beam profile along the second surface.

28. An apparatus as in claim 25, wherein
as the input light is reflected said plurality of times between the first and second surfaces, reflection by the second surface defines a plurality of reflected lights travelling from the second surface to the first surface, and
the plurality of reflected lights have a uniform optical phase along the second surface.

29. An apparatus as in claim 25, wherein
as the input light is reflected said plurality of times between the first and second surfaces, reflection by the second surface defines a plurality of reflected lights travelling from the second surface to the first surface, and
the apparatus further comprises means for causing the plurality of reflected lights to have a uniform optical phase along the second surface.

30. An apparatus as in claim 25, wherein
as the input light is reflected said plurality of times between the first and second surfaces, reflection by the second surface defines a plurality of reflected lights travelling from the second surface to the first surface, and
the apparatus further comprises a phase adjustment layer causing the plurality of reflected lights to have a uniform optical phase along the second surface.

31. An apparatus as in claim 30, wherein the phase adjustment layer is provided along the second surface and between the first and second surfaces.

32. An apparatus as in claim 25, wherein the plurality of transmitted lights have a uniform optical phase along the second surface.

33. An apparatus as in claim 25, further comprising a phase adjustment layer which causes the plurality of transmitted lights to have a uniform optical phase along the second surface.

34. An apparatus as in claim 33, wherein the phase adjustment layer is along the second surface and to an opposite side from the first surface.

35. An apparatus as in claim 25, further comprising:
means for causing the plurality of transmitted lights to have a uniform optical phase along the second surface.

36. An apparatus as in claim 25, wherein the first surface has a reflectivity of substantially 100%.

37. An apparatus as in claim 25, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

38. An apparatus as in claim 25, wherein the input light is focused to a line between the first and second surfaces, to be reflected said plurality of times between the first and second surfaces.

39. An apparatus as in claim 25, wherein the reflectivity of the second surface varies along the second surface so that the output light has a beam profile which is one of the group consisting of:
an approximately symmetric beam profile along the second surface,
an approximate bell curve beam profile along the second surface,
an approximate Gaussian beam profile along the second surface,
an asymmetric beam profile along the second surface, and
a double-hump shaped beam profile along the second surface.

40. An apparatus as in claim 25, further comprising:
a light returning device which causes the output light to be returned to the second surface and pass therethrough so that the returned output light undergoes multiple reflection between the first and second surfaces.

41. An apparatus as in claim 40, wherein the light returning device is a mirror.

42. An apparatus as in claim 40, wherein the light returning device comprises:
a mirror; and
a lens which focuses the output light onto the mirror so that the mirror reflects the output light, the reflected output light being directed by the lens back to the second surface.

43. An apparatus comprising:
first and second surfaces in parallel with each other, the first surface having a reflectivity which allows substantially no light to pass therethrough, the second surface having a reflectivity which causes a portion of light incident thereon to be transmitted therethrough, the reflectivity of the second surface varying along the second surface; and
a radiation window in the same plane as the first surface, wherein
an input light at a respective wavelength passes through the radiation window to be focused into a line between the first and second surfaces, the first and second surfaces being positioned so that the input light travels from the line and is then reflected a plurality of times between the first and second surfaces to cause a plurality of lights to be transmitted through the second surface, the plurality of transmitted lights interfering with each other to produce a collimated output light which is angularly dispersed from the second surface in accordance with the wavelength of the input light, to thereby provide an output light which is spatially distinguishable from an output light produced for an input light at a different wavelength.

44. An apparatus as in claim 43, wherein,
as the input light is reflected said plurality of times between the first and second surfaces, a light incident position of the input light on the second surface moves from a beginning incident position to an ending incident position, and
the reflectivity decreases along the second surface from the beginning incident position to the ending incident position.

45. An apparatus as in claim 43, wherein,
as the input light is reflected said plurality of times between the first and second surfaces, a light incident position of the input light on the second surface moves from a beginning incident position to an ending incident position, and
the reflectivity decreases along the second surface from the beginning incident position to the ending incident position so that the output light has an approximately symmetric beam profile along the second surface.

46. An apparatus as in claim 43, wherein
as the input light is reflected said plurality of times between the first and second surfaces, reflection by the second surface defines a plurality of reflected lights travelling from the second surface to the first surface, and
the plurality of reflected lights have a uniform optical phase along the second surface.

47. An apparatus as in claim 43, wherein
as the input light is reflected said plurality of times between the first and second surfaces, reflection by the second surface defines a plurality of reflected lights travelling from the second surface to the first surface, and
the apparatus further comprises means for causing the plurality of reflected lights to have a uniform optical phase along the second surface.

48. An apparatus as in claim 43, wherein
as the input light is reflected said plurality of times between the first and second surfaces, reflection by the second surface defines a plurality of reflected lights travelling from the second surface to the first surface, and
the apparatus further comprises a phase adjustment layer causing the plurality of reflected lights to have a uniform optical phase along the second surface.

49. An apparatus as in claim 48, wherein the phase adjustment layer is provided along the second surface and between the first and second surfaces.

50. An apparatus as in claim 43, wherein the plurality of transmitted lights have a uniform optical phase along the second surface.

51. An apparatus as in claim 43, further comprising a phase adjustment layer which causes the plurality of transmitted lights to have a uniform optical phase along the second surface.

52. An apparatus as in claim 51, wherein the phase adjustment layer is along the second surface and to an opposite side from the first surface.

53. An apparatus as in claim 43, further comprising:

means for causing the plurality of transmitted lights to have a uniform optical phase along the second surface.

54. An apparatus as in claim 43, wherein the first surface has a reflectivity of substantially 100%.

55. An apparatus as in claim 43, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

56. An apparatus as in claim 43, wherein the reflectivity of the second surface varies along the second surface so that the output light has a beam profile which is one of the group consisting of:

an approximately symmetric beam profile along the second surface, an approximate bell curve beam profile along the second surface, an approximate Gaussian beam profile along the second surface, an asymmetric beam profile along the second surface, and a double-hump shaped beam profile along the second surface.

57. An apparatus as in claim 43, further comprising:

a light returning device which causes the output light to be returned to the second surface and pass therethrough so that the returned output light undergoes multiple reflection between the first and second surfaces.

58. An apparatus as in claim 57, wherein the light returning device is a mirror.

59. An apparatus as in claim 57, wherein the light returning device comprises:

a mirror; and a lens which focuses the output light onto the mirror so that the mirror reflects the output light, the reflected output light being directed by the lens back to the second surface.

* * * * *

UNITED STATES PATENT AND TRADEMARK OFFICE
CERTIFICATE OF CORRECTION

PATENT NO. : 6,304,382 B1
DATED : October 16, 2001
INVENTOR(S) : Masataka Shirasaki et al.

It is certified that error appears in the above-identified patent and that said Letters Patent is hereby corrected as shown below:

<u>Title page,</u>
Please add the following section: -- [73], Fujitsu Limited, Kawasaki, Japan and Avanex, Corporation, Fremont, CA, USA --

Signed and Sealed this

Twenty-fifth Day of June, 2002

*Attest:*

*Attesting Officer*

JAMES E. ROGAN
*Director of the United States Patent and Trademark Office*